United States Patent
Tanahashi et al.

(10) Patent No.: US 10,270,636 B2
(45) Date of Patent: Apr. 23, 2019

(54) WIRELESS COMMUNICATION APPARATUS, INTEGRATED CIRCUIT, TRANSMISSION METHOD, RECEPTION METHOD, AND COMMUNICATION METHOD

(71) Applicant: Kabushiki Kaisha Toshiba, Minato-ku (JP)

(72) Inventors: Makoto Tanahashi, Yokohama (JP); Toshiyuki Nakanishi, Yokohama (JP); Yoshimasa Egashira, Kawasaki (JP); Noboru Taga, Konosu (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/441,439

(22) Filed: Feb. 24, 2017

(65) Prior Publication Data

US 2017/0163459 A1    Jun. 8, 2017

Related U.S. Application Data

(63) Continuation of application No. PCT/JP2015/084912, filed on Dec. 14, 2015.

(30) Foreign Application Priority Data

Feb. 23, 2015    (JP) ................. 2015-033100

(51) Int. Cl.
*H04L 27/26* (2006.01)
*H04J 11/00* (2006.01)
*H04L 5/00* (2006.01)

(52) U.S. Cl.
CPC .......... *H04L 27/2621* (2013.01); *H04J 11/00* (2013.01); *H04L 5/0048* (2013.01);
(Continued)

(58) Field of Classification Search
CPC .... H04B 1/02; H04B 7/02; H04B 7/08; H04J 3/06; H04J 11/00; H04K 1/10; H04L 5/00;
(Continued)

(56) References Cited

U.S. PATENT DOCUMENTS

2002/0172184 A1* 11/2002 Kim ................. H03M 13/2703
370/344
2003/0202460 A1    10/2003 Jung et al.
(Continued)

FOREIGN PATENT DOCUMENTS

| JP | 2005-524278 A | 8/2005 |
| JP | 2005-341056 A | 12/2005 |
| JP | 2009-55395 A | 3/2009 |

OTHER PUBLICATIONS

International Search Report dated Feb. 23, 2016 in PCT/JP2015/084912 (with English language translation).
(Continued)

*Primary Examiner* — Shawkat M Ali
(74) *Attorney, Agent, or Firm* — Oblon, McClelland, Maier & Neustadt, L.L.P.

(57) ABSTRACT

In some embodiments, a wireless communication apparatus may include, but is not limited to, a pilot inserter, a segment divider, a phase rotator, and a first adder. The pilot inserter inserts first and second pilot symbols into a symbol stream. The segment divider divides into a plurality of segments a plurality of subcarriers. Each of the subcarriers is allocated with a respective one of the symbols included in the symbol stream into which the first and second pilot symbols have been inserted. The phase rotator performs, for each segment, a phase rotation to all of the symbols, except for a predetermined one of the first and second pilot symbols, included in the symbol stream. The first adder adds together signals corresponding to the subcarriers included in the plurality of
(Continued)

segments to which the phase rotation has been performed by the phase rotator to generate a transmission signal.

4 Claims, 20 Drawing Sheets

(52) U.S. Cl.
CPC ...... *H04L 27/2613* (2013.01); *H04L 27/2618* (2013.01); *H04L 27/2666* (2013.01)

(58) Field of Classification Search
CPC ..... H04L 5/0048; H04L 27/26; H04L 27/261; H04L 27/2621; H04L 27/28; H04W 72/14
USPC ........ 370/206, 208, 210, 491; 375/219, 260, 375/267, 295, 316; 455/101, 132
See application file for complete search history.

(56) References Cited

U.S. PATENT DOCUMENTS

| | | |
|---|---|---|
| 2005/0265226 A1 | 12/2005 | Shen et al. |
| 2006/0028976 A1* | 2/2006 | Park ................. H04L 5/0023 370/203 |
| 2007/0189406 A1* | 8/2007 | Kim .................. H04L 27/2613 375/260 |
| 2007/0217329 A1* | 9/2007 | Abedi ................ H04L 27/2614 370/208 |
| 2008/0285673 A1 | 11/2008 | Han et al. |
| 2009/0103648 A1* | 4/2009 | Fukuoka ............ H04L 5/0044 375/267 |
| 2009/0323515 A1* | 12/2009 | Ishikura ............. H04L 5/0007 370/210 |
| 2010/0034186 A1* | 2/2010 | Zhou ................. H04L 27/2621 370/344 |

OTHER PUBLICATIONS

Tae-Young Han, et al., "A PTS-OFDM Phase-Superimposed Over Pilot Symbols" Advanced Communication Technology, 10$^{th}$ international Conference, vol. 2, 2008, pp. 1027-1031.

* cited by examiner

US 10,270,636 B2

WIRELESS COMMUNICATION APPARATUS, INTEGRATED CIRCUIT, TRANSMISSION METHOD, RECEPTION METHOD, AND COMMUNICATION METHOD

CROSS-REFERENCE TO RELATED APPLICATIONS

This application is a continuation application of International Application No. PCT/JP2015/084912, filed Dec. 14, 2015, which claims priority to Japanese Patent Application No. 2015-033100, filed Feb. 23, 2015. The contents of these applications are incorporated herein by reference in their entirety.

FIELD

Embodiments of the present invention relate to a wireless communication apparatus, an integrated circuit, a transmission method, a reception method, and a communication method.

BACKGROUND

In an OFDM (orthogonal frequency division multiplexing) system, the PAPR (peak-to-average power ratio) is high. Because a signal having a high PAPR tends to cause distortion in a power amplifier, numerous methods have been proposed to reduce the PAPR. One of the proposed methods is PTS (partial transmit sequence), which has a feature of being able to reduce the PAPR without causing signal distortion, making it a preferable method for use in actual systems. PTS is a method whereby a plurality of subcarriers in an OFDM system are divided into a number of groups, and phase rotations are imparted to the subcarrier signals for each group so as to reduce the PAPR. The groups into which the plurality of subcarriers is divided are called segments.

A receiver must acquire the phase rotations that are performed to the subcarrier signals included in each segment in the transmitter. As a method of the transmitter notifying the receiver of the phase rotations, for example, the transmitter transmits a reference symbol having a known phase in each segment, and the receiver estimates the phase rotation of each segment performed by PTS from the displacement of the phase of the reference symbol.

Because phase rotation occurs to the reference symbol in the wireless transmission path from a transmitter to a receiver, the phase rotation amount performed by PTS and the phase rotation amount occurring in the wireless transmission path are included in the phase displacement of the reference symbol. In general, when receiving a signal to which PTS has been applied, it is necessary to acquire the phase rotation amount in response to the time variation of transmission path and the phase rotation amount by PTS.

DETAILED DESCRIPTION

Figure 1:
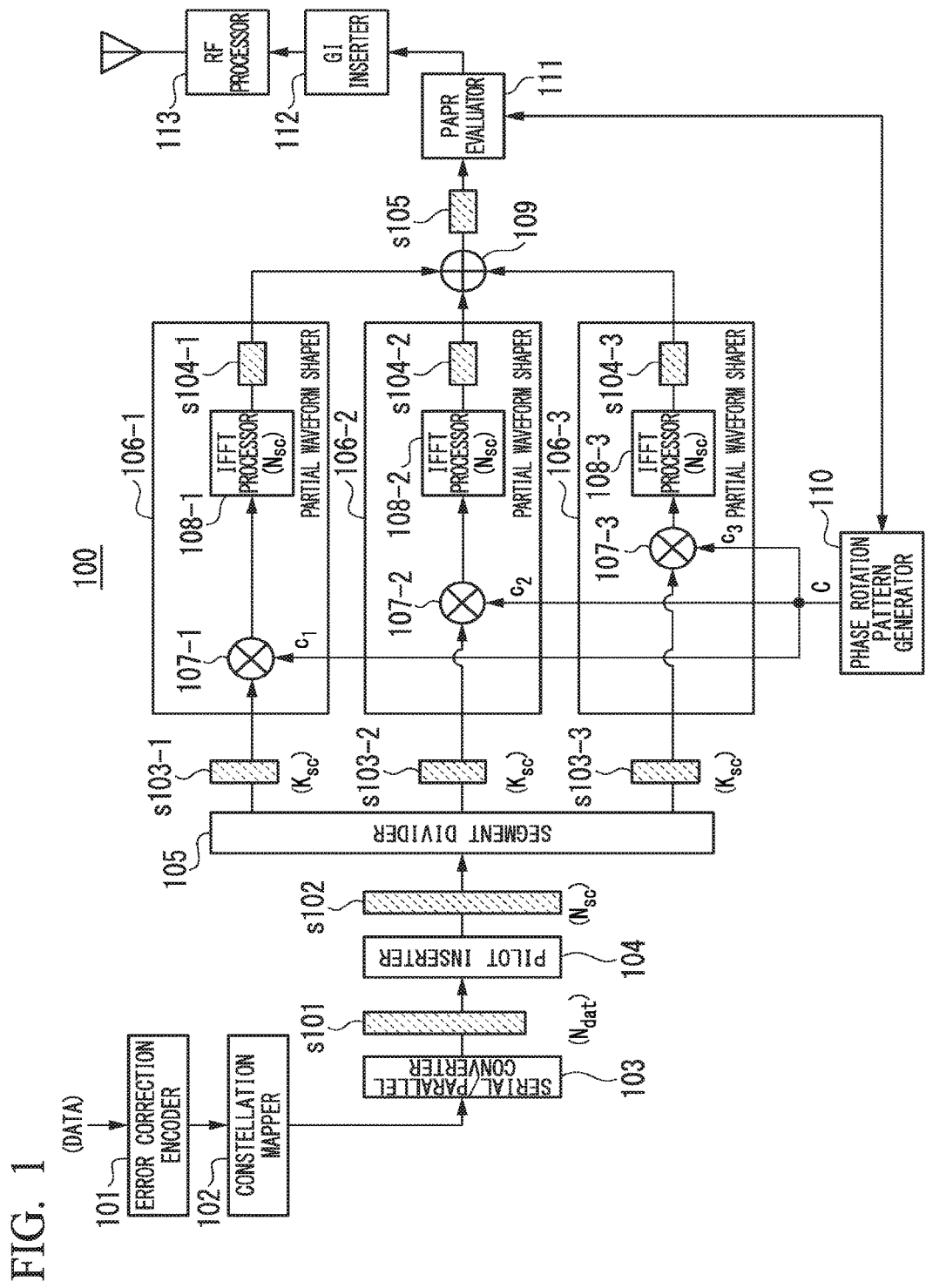
FIG. 1 is a block diagram illustrating the configuration regarding transmission in the wireless communication apparatus in the first embodiment.

In some embodiments, a wireless communication apparatus may include, but is not limited to, a pilot inserter, a segment divider, a phase rotator, and a first adder. The pilot inserter inserts first and second pilot symbols into a symbol stream. The segment divider divides into a plurality of segments a plurality of subcarriers. Each of the subcarriers is allocated with a respective one of the symbols included in the symbol stream into which the first and second pilot symbols have been inserted. The phase rotator performs, for each segment, a phase rotation to all of the symbols, except for a predetermined one of the first and second pilot symbols, included in the symbol stream. The first adder adds together signals corresponding to the subcarriers included in the plurality of segments to which the phase rotation has been performed by the phase rotator to generate a transmission signal.

In some cases, the first pilot symbol is periodically inserted into the plurality of subcarriers. At least one of the second pilot symbol is inserted into each of the segments.

In other cases, the pilot inserter inserts the second pilot symbol into a subcarrier of the plurality of subcarriers. The subcarrier into which the second pilot symbol is inserted is adjacent to the subcarrier into which the first pilot symbol is inserted.

In still other cases, the wireless communication apparatus may further include, but is not limited to, an inverse Fourier transformer. The inverse Fourier transformer, using an inverse Fourier transform, for each of the segments, transforms, into a time-domain signal, a signal of each segment to which the phase rotation has been performed by the phase rotator. The first adder adds together time-domain signals corresponding to the plurality of segments to generate the transmission signal.

In further cases, the wireless communication apparatus may further include, but is not limited to, a second adder. The second adder adds the time-domain signals corresponding to the segments with respective sine wave signals which are defined depending upon frequencies of the subcarriers into which the second pilot symbol has been inserted. The first adder adds together the time-domain signals after added with the respective sine wave signals to generate a transmission signal. The pilot inserter inserts a zero symbol into the symbol stream as the second pilot symbol.

In other embodiments, a wireless communication apparatus may include, but is not limited to, a pilot inserter, a segment divider, a phase rotator, and a first adder. The pilot inserter inserts first and second pilot symbols into a symbol stream. The segment divider divides into a plurality of segments a plurality of subcarriers. Each of the subcarriers is allocated with a respective one of the symbols included in the symbol stream into which the first and second pilot symbols have been inserted. The phase rotator performs, for each segment, a phase rotation to all of the symbols included in the symbol stream into which the first and second pilot symbols have been inserted. The first adder adds together signals corresponding to the subcarriers included in the plurality of segments to which the phase rotation been performed by the phase rotator to generate a transmission signal.

In some cases, the first pilot symbol is periodically inserted in the plurality of subcarriers. At least one of the second pilot symbol is inserted into each of the segments. A predetermined one of the first pilot symbol and the second pilot symbol is inserted into a subcarrier next a boundary between two adjacent segments of the segments, the subcarrier being included in the plurality of subcarriers. The second pilot symbol is inserted adjacently to the first pilot symbol in the time direction.

In other cases, the wireless communication apparatus may further include, but is not limited to, an inverse Fourier transformer. The inverse Fourier transformer transforms, using an inverse Fourier transform, for each of the segments, into a time-domain signal, a signal of each segment to which the phase rotation has been performed by the phase rotator. The first adder adds together time-domain signals corresponding to the plurality of segments to generate the transmission signal.

In still other embodiments, the wireless communication apparatus may further include, but is not limited to, an RF processor. The RF processor performs transmission signal processing for signal transmission from an antenna.

In yet other embodiments, a wireless communication apparatus may include, but is not limited to, a segment divider, a phase processor, and a segment combiner. The segment divider divides a plurality of subcarriers in a transmission signal into a plurality of segments. The phase processor, based at least in part on first and second pilot symbols in each segment of the plurality of segments, estimates a first amount of phase rotation which would have been given at a transmitting side to all of the symbols, except for a predetermined one of the first and second pilot symbols, in the segment and a second amount of phase rotation which would have been caused by propagation of the transmission signal in a transmission path from the transmitting side. The phase processor cancels the symbol with the first and second amounts of phase rotation. The segment combiner combines the symbols of the plurality of segments, after the symbols have been canceled with the first and second amounts of phase rotation.

In some cases, the first pilot symbol is periodically inserted into the plurality of subcarriers. At least one of the second pilot symbol is inserted into each of the segments.

In other cases, the second pilot symbol is adjacent to the first pilot symbol.

In further embodiments, a wireless communication apparatus may include, but is not limited to, a segment divider, a phase processor, and a segment combiner. The segment divider divides a plurality of subcarriers in a transmission signal into a plurality of segments. The phase processor, based at least in part on first and second pilot symbols in each segment, estimates a first amount of phase rotation which would have been given at a transmitting side to all of the symbols including the first and second pilot symbols and being included in the segment and a second amount of phase rotation which would have been caused by propagation of the transmission signal in a transmission path from the transmitting side. The phase processor cancels the symbol with the first and second amounts of phase rotation. The segment combiner combines the symbols of the plurality of segments, after the symbols have been canceled with the first and second amounts of phase rotation. The phase processor may include, but is not limited to, a storage, a phase rotation amount calculator, a first phase difference remover, a second phase difference remover, and an equalizer. The storage stores symbols included in each of the plurality of segment. The phase rotation amount calculator calculates a third amount of phase rotation for each segment of the plurality of segments, based at least in part on the first and second pilot symbols of each segment, the first and second pilot symbols being stored in the storage. The first phase difference remover calculates a first phase difference in the third mount of phase rotation between a reference segment and a segment which is different in time direction from the reference segment and has a same subcarrier as that of the reference segment, the reference segment and the segment being included in the plurality of segments. The first phase difference remover cancels the segment with the first phase difference, and updates the symbols in the storage with symbols of the segment canceled with the first phase difference. The second phase difference remover calculates a second phase difference in the third mount of phase rotation between the reference segment and a segment which is different in subcarrier from and the same in receiving time as the reference segment. The reference segment and the segment are included in the plurality of segments. The second phase difference remover cancels the segment with the second phase difference, and updates the symbols in the storage with symbols of the segment canceled with the second phase difference. The equalizer cancels the symbols with the third amount of phase rotation for the reference segment, after updating the symbols in the storage with symbols of the segment canceled with the first phase difference and updating the symbols in the storage with symbols of the segment canceled with the second phase difference.

In some cases, the wireless communication apparatus may include, but is not limited to, an RF processor. The RF processor performs processing of signals, including the plurality of subcarriers, received from an antenna.

In yet further embodiments, an integrated circuit may include, but is not limited to, a pilot inserter, a segment divider, a phase rotator, and a first adder. The pilot inserter that inserts first and second pilot symbols into a symbol stream. The segment divider divides into a plurality of segments a plurality of subcarriers. Each of the subcarriers is allocated with a respective one of the symbols included in the symbol stream into which the first and second pilot symbols have been inserted. The phase rotator, for each segment, performs a phase rotation to all of the symbols, except for a predetermined one of the first and second pilot symbols, included in the symbol stream. The first adder adds together signals corresponding to the subcarriers included in the plurality of segments to which the phase rotation has been performed by the phase rotator to generate a transmission signal.

In furthermore embodiments, a wireless communication apparatus may include, but is not limited to, an antenna, and an integrated circuit. The antenna transmits a transmission signal. The integrated circuit may include, but is not limited to, a pilot inserter, a segment divider, a phase rotator, and a first adder. The pilot inserter inserts first and second pilot symbols into a symbol stream. The segment divider divides into a plurality of segments a plurality of subcarriers, wherein each of the subcarriers is allocated with a respective one of the symbols included in the symbol stream into which the first and second pilot symbols have been inserted. The phase rotator, for each segment, performs a phase rotation to all of the symbols, except for a predetermined one of the first and second pilot symbols, included in the symbol stream. The first adder adds together signals corresponding to the subcarriers included in the plurality of segments to which the phase rotation has been performed by the phase rotator to generate a transmission signal.

In moreover embodiments, a transmission method may include, but is not limited to, the following acts or operations. First and second pilot symbols are inserted into a symbol stream. A plurality of subcarriers is divided into a plurality of segments. Each of the subcarriers is allocated with a respective one of the symbols included in the symbol stream into which the first and second pilot symbols have been inserted. A phase rotation is performed, for each segment, to all of the symbols, except for a predetermined one of the first and second pilot symbols, included in the symbol stream. There is adding together signals corresponding to the subcarriers included in the plurality of segments to which the phase rotation has been performed by the phase rotator to generate a transmission signal.

In additional embodiments, a transmission method may include, but is not limited to, the following acts or operations. First and second pilot symbols are inserted into a symbol stream. A plurality of subcarriers is divided into a plurality of segments. Each of the subcarriers is allocated with a respective one of the symbols included in the symbol stream into which the first and second pilot symbols have been inserted. A phase rotation is performed, for each segment, to all of the symbols included in the symbol stream into which the first and second pilot symbols have been inserted. There is adding together signals corresponding to the subcarriers included in the plurality of segments to which the phase rotation been performed by the phase rotator to generate a transmission signal.

In still additional embodiments, a reception method may include, but is not limited to, the following acts or operations. A plurality of subcarriers in a transmission signal is divided into a plurality of segments. There is estimating, based at least in part on first and second pilot symbols in each segment of the plurality of segments, a first amount of phase rotation which would have been given at a transmitting side to all of the symbols, except for a predetermined one of the first and second pilot symbols, in the segment and a second amount of phase rotation which would have been caused by propagation of the transmission signal in a transmission path from the transmitting side. The symbol is canceled with the first and second amounts of phase rotation. The symbols of the plurality of segments are combined after the symbols have been canceled with the first and second amounts of phase rotation.

In yet additional embodiments, a reception method may include, but is not limited to, the following acts or operations. A plurality of subcarriers in a transmission signal is divided into a plurality of segments. There is estimating, based at least in part on first and second pilot symbols in each segment, a first amount of phase rotation which would have been given at a transmitting side to all of the symbols including the first and second pilot symbols and being included in the segment and a second amount of phase rotation which would have been caused by propagation of the transmission signal in a transmission path from the transmitting side. The symbol is canceled with the first and second amounts of phase rotation. The symbols of the plurality of segments are combined after the symbols have been canceled with the first and second amounts of phase rotation. A step of canceling may include, but is not limited to, the following acts or operations. Symbols included in each of the plurality of segment are stored. A third amount of phase rotation for each segment of the plurality of segments is calculated based at least in part on the first and second pilot symbols of each segment, the first and second pilot symbols being stored. There is calculating a first phase difference in the third mount of phase rotation between a reference segment and a segment which is different in time direction from the reference segment and has a same subcarrier as that of the reference segment, the reference segment and the segment being included in the plurality of segments. The segment is canceled with the first phase difference. The symbols being stored are updated with symbols of the segment canceled with the first phase difference. There is calculating a second phase difference in the third mount of phase rotation between the reference segment and a segment which is different in subcarrier from and the same in receiving time as the reference segment, the reference segment and the segment being included in the plurality of segments. The segment is canceled with the second phase difference. The symbols in the storage are updated with symbols of the segment canceled with the second phase difference. The symbols are canceled with the third amount of phase rotation for the reference segment, after updating the symbols being stored with symbols of the segment canceled with the first phase difference and updating the symbols in the storage with symbols of the segment canceled with the second phase difference.

In still more additional embodiments, a communication method may include, but is not limited to, the following acts or operations. First and second pilot symbols are inserted into a symbol stream. A plurality of subcarriers is divided into a plurality of segments. Each of the subcarriers is allocated with a respective one of the symbols included in the symbol stream into which the first and second pilot symbols have been inserted. A phase rotation is performed, for each segment, to all of the symbols, except for a predetermined one of the first and second pilot symbols, included in the symbol stream. There is adding together signals corresponding to the subcarriers included in the plurality of segments to which the phase rotation has been performed by the phase rotator to generate a transmission signal. The transmission signal is transmitted. The transmission signal is received. A plurality of subcarriers in the transmission signal received is divided into a plurality of segments. There is estimating, based at least in part on first and second pilot symbols in each segment of the plurality of segments, a first amount of phase rotation which would have been given at a transmitting side to all of the symbols, except for a predetermined one of the first and second pilot symbols, in the segment and a second amount of phase rotation which would have been caused by propagation of the transmission signal in a transmission path from the transmitting side. The symbol is canceled with the first and second amounts of phase rotation. The symbols of the plurality of segments are combined after the symbols have been canceled with the first and second amounts of phase rotation.

In yet more additional embodiments, a communication method may include, but is not limited to, the following acts or operations. First and second pilot symbols are inserted into a symbol stream. A plurality of subcarriers is divided into a plurality of segments. Each of the subcarriers is allocated with a respective one of the symbols included in the symbol stream into which the first and second pilot symbols have been inserted. A phase rotation is performed, for each segment, to all of the symbols included in the symbol stream into which the first and second pilot symbols have been inserted. There is adding together signals corresponding to the subcarriers included in the plurality of segments to which the phase rotation been performed by the phase rotator to generate a transmission signal. The transmission signal is transmitted. The transmission signal is received. A plurality of subcarriers in the transmission signal received is divided into a plurality of segments. There is estimating, based at least in part on first and second pilot symbols in each segment, a first amount of phase rotation which would have been given at a transmitting side to all of the symbols including the first and second pilot symbols and being included in the segment and a second amount of phase rotation which would have been caused by propagation of the transmission signal in a transmission path from the transmitting side. The symbol is canceled with the first and second amounts of phase rotation. The symbols of the plurality of segments are combined after the symbols have been canceled with the first and second amounts of phase rotation. A step of canceling may include, but is not limited to, the following acts or operations. Symbols included in each of the plurality of segment are stored. A third amount of phase rotation for each segment of the plurality of segments is calculated based at least in part on the first and second pilot symbols of each segment, the first and second pilot symbols being stored. There is calculating a first phase difference in the third mount of phase rotation between a reference segment and a segment which is different in time direction from the reference segment and has a same subcarrier as that of the reference segment, the reference segment and the segment being included in the plurality of segments. The segment is canceled with the first phase difference. The symbols being stored are updated with symbols of the segment canceled with the first phase difference. There is calculating a second phase difference in the third mount of phase rotation between the reference segment and a segment which is different in subcarrier from and the same in receiving time as the reference segment, the reference segment and the segment being included in the plurality of segments. The segment is canceled with the second phase difference. The symbols in the storage are updated with symbols of the segment canceled with the second phase difference. The symbols are canceled with the third amount of phase rotation for the reference segment, after updating the symbols being stored with symbols of the segment canceled with the first phase difference and updating the symbols in the storage with symbols of the segment canceled with the second phase difference.

A wireless communication apparatus, an integrated circuit, a transmission method, a reception method, and a communication method of embodiments will be described below, with references made to the drawings. In the following embodiments, elements that are assigned the same reference symbols operate in the same manner, and duplicated descriptions thereof will be omitted as appropriate. The description to follow is for the case in which the plurality of subcarriers in an OFDM system is divided into three segments. The number of segments may be two or four or greater.

First Embodiment

FIG. 1 is a block diagram illustrating the configuration regarding transmission in the wireless communication apparatus 100 in the first embodiment. The wireless communication apparatus 100 reduces the PAPR by performing phase rotation to the signals of each segment. As shown in this drawing, the wireless communication apparatus 100 has an error correction encoder 101, a constellation mapper 102, a serial/parallel converter (S/P converter) 103, a pilot inserter 104, a segment divider 105, partial waveform shapers 106-1, 106-2, and 106-3, an adder 109, a phase rotation pattern generator 110, a PAPR evaluator (peak-to-average power ratio evaluator) 111, a GI inserter 112, and an RF processor 113. The partial waveform shaper 106-1 has a multiplier 107-1 and an IFFT processor 108-1. The partial waveform shaper 106-2 has a multiplier 107-2 and an IFFT processor 108-2. The partial waveform shaper 106-3 has a multiplier 107-3 and an IFFT processor 108-3. In FIG. 1, the hatched rectangles to which the reference symbols s101, s102, s103-1 to s103-3, s104-1 to s104-3, and s105 are applied indicate signals in the wireless communication apparatus 100.

The data transmitted by the wireless communication apparatus 100 is a random bit stream of 0's and 1's, which will now be described. The error correction encoder 101 performs error correction encoding of the bit stream to be transmitted and supplies an encoded bit stream obtained by error correction encoding to the constellation mapper 102. The constellation mapper 102 maps onto modulation symbols expressed as complex values the encoded bit stream every predetermined number of bits. The constellation mapper 102 supplies modulation symbol stream obtained by mapping to the serial/parallel converter 103.

The serial/parallel converter 103 converts the modulation symbol stream into a first symbol stream s101 in which Ndat modulation symbols are made parallel. The serial/parallel converter 103 supplies the first symbol stream s101 to the segment divider 104. If the number of subcarriers used for transmission by the wireless communication apparatus 100 is Nsc, Ndat must be less than Nsc (Ndat<Nsc).

The pilot inserter 104 inserts (Nsc−Ndat) pilot symbols into the first symbol stream s101. The second symbol stream s102 into which the pilot symbols have been inserted is a stream of Nsc symbols that has been made parallel. The pilot symbols inserted by the pilot inserter 104 are placed in certain subcarriers decided by communication rules. The phases of the pilot symbols are predetermined, according to the communication rules. The pilot inserter 104 supplies the second symbol stream s102 to the segment divider 105. The Nsc symbols that were made parallel in the second symbol stream s102 correspond to the Nsc subcarriers, respectively.

The segment divider 105 divides the second symbol stream s102 into a symbol stream of Nseg segments. The segment divider 105 divides second symbol stream s102 into the divided symbol streams s103-1, s103-2, and s103-3 corresponding to the three segments. The divided symbol streams s103-1, s103-2, and s103-3 are each symbol streams in which Ksc (=Nsc/Nseg) symbols are made parallel. The number of symbols that are made parallel may be different among divided symbol streams corresponding to the segments. The segment divider 105 supplies the divided symbol streams s103-1, s103-2, and s103-3 obtained by the division to the partial waveform shapers 106-1, 106-2, and 106-3, respectively.

In the partial waveform shaper 106-1, the multiplier 107-1 multiplies the divided symbol stream s103-1 input from the segment divider 105 by the complex scalar value $c_1$ and supplies a result of the multiplication to the IFFT processor 108-1. The complex scalar value $c_1$ is supplied to the multiplier 107-1 from the phase rotation pattern generator 110. By multiplying modulation symbols placed in predetermined subcarriers among the modulation symbols in the divided symbol stream s103-1 by the complex scalar value $c_1$, the multiplier 107-1 performs the phase rotation represented by the scalar value $c_1$ to the modulation symbols placed in predetermined subcarriers. The multiplier 107-1 operates as a phase rotator.

The IFFT processor 108-1 transforms the divided symbol stream to which a phase rotation is performed by the multiplier 107 to a frequency-domain signal. The IFFT processor 108-1 performs an $N_{sc}$-point inverse FFT of the divided symbol stream to convert the divided symbol stream into the time-domain signal s104-1. The IFFT processor 108-1 supplies the time-domain signal s104-1 obtained by the transform to the adder 109.

In the partial waveform shapers 106-2 and 106-3 as well, the multipliers 107-2 and 107-3 and the IFFT processors 108-2 and 108-3 operates the same as the multiplier 107-1 and the IFFT processor 108-1. That is, the multiplication by the complex scalar values $c_2$ and $c_3$ and the transformation by a Nsc-point inverse FFT are performed to the divided symbol streams s103-2 and s103-3. The time-domain signals s104-2 and the time-domain signal s104-3 are supplied to the adder 109. The multipliers 107-2 and 107-3, similar to the multiplier 107-1, operate as phase rotators.

In the multipliers 107-1, 107-2, and 107-3, each of the scalar values $c_n$ (n=1, 2, . . . , Nseg) that are multiplied the divided symbol streams s103-1, s103-2, and s103-3 has assigned thereto a value of one of M points defined on a unit circle on the complex plane. For example, if M=4, the scalar value assigned to $c_n$ is one of [+1, +j, −1, −j], where j is the imaginary unit. When defining the M points, they need not be equally spaced as noted above by π/2 (Pi/2), and may be established at arbitrary positions on the unit circle.

The adder 109 acquires the time-domain signals 104-1, 104-2, and 104-3 respectively supplied from the partial waveform shapers 106-1, 106-2, and 106-3. The adder 109 adds the time-domain signal s104-1, 104-2, and 104-3, and supplies the result of the addition as the OFDM signal s105 to the peak-to-average PAPR evaluator 111. By adding the time-domain signals 104-1, 104-2, and 104-3 in the adder 109, the OFDM signal s105 includes Nsc symbols.

The phase rotation pattern generator 110 stores a plurality of combination patterns of the phase rotation amounts to be performed to each segment. In the following, the phase rotation amount combinations will be referred to as phase rotation patterns. The number of phase rotation patterns stored in the phase rotation pattern generator 110 has a maximum of $M^{(Nseg)}$. The phase rotation pattern generator 110 may store a number of phase rotation patterns that is less than $M^{(Nseg)}$. The phase rotation patterns are the combinations C=[$c_1$, $c_2$, . . . , $c_{Nseg}$] of the phase rotation amounts $c_n$ (n=1, 2, . . . , Nseg) to each segment. The phase rotation pattern generator 110 selects one from among a plurality of phase rotation patterns in sequence and supplies the scalar values $c_n$=(n=1, 2, . . . , Nseg) included in the selected phase rotation pattern to the partial waveform shapers 106-1, 106-2, and 106-3, respectively. By the phase rotation pattern generator 110 supplying a plurality of phase rotation patterns to the partial waveform shapers 106-1, 106-2, and 106-3, the PAPR evaluator 111 acquires from the adder 109 a plurality of OFDM signals 105 with respect to the same modulation symbol.

The PAPR evaluator 111, for each phase rotation pattern, calculates a peak-to-average power ratio with respect to the OFDM signal s105. In the following, the peak-to-average power ratio will be referred to as the PAPR. The PAPR evaluator 111, by calculating the power value of the OFDM signal s105 over a predetermined period, calculates the PAPR corresponding to the phase rotation pattern. The PAPR evaluator 111 selects the OFDM signal s105 that has the smallest PAPR and supplies the selected OFDM signal s105 to the GI inserter 112. The above-described operation by the PAPR evaluator 111 is the operation to select, from a predetermined number of phase rotation patterns, the phase rotation pattern having the smallest PAPR.

The GI inserter 112 inserts a guard interval into the OFDM signal s105 supplied from the PAPR evaluator 111. The GI inserter 112 supplies to the RF processor 113 the OFDM signal that includes the guard interval. The RF processor 113 performs transmission signal processing to the OFDM signal that includes the guard interval and transmits it from an antenna. The transmission signal processing performed in the RF processor 113 includes, for example, digital/analog conversion, up-conversion to a wireless frequency, and amplification to the transmission power.

Figure 2:
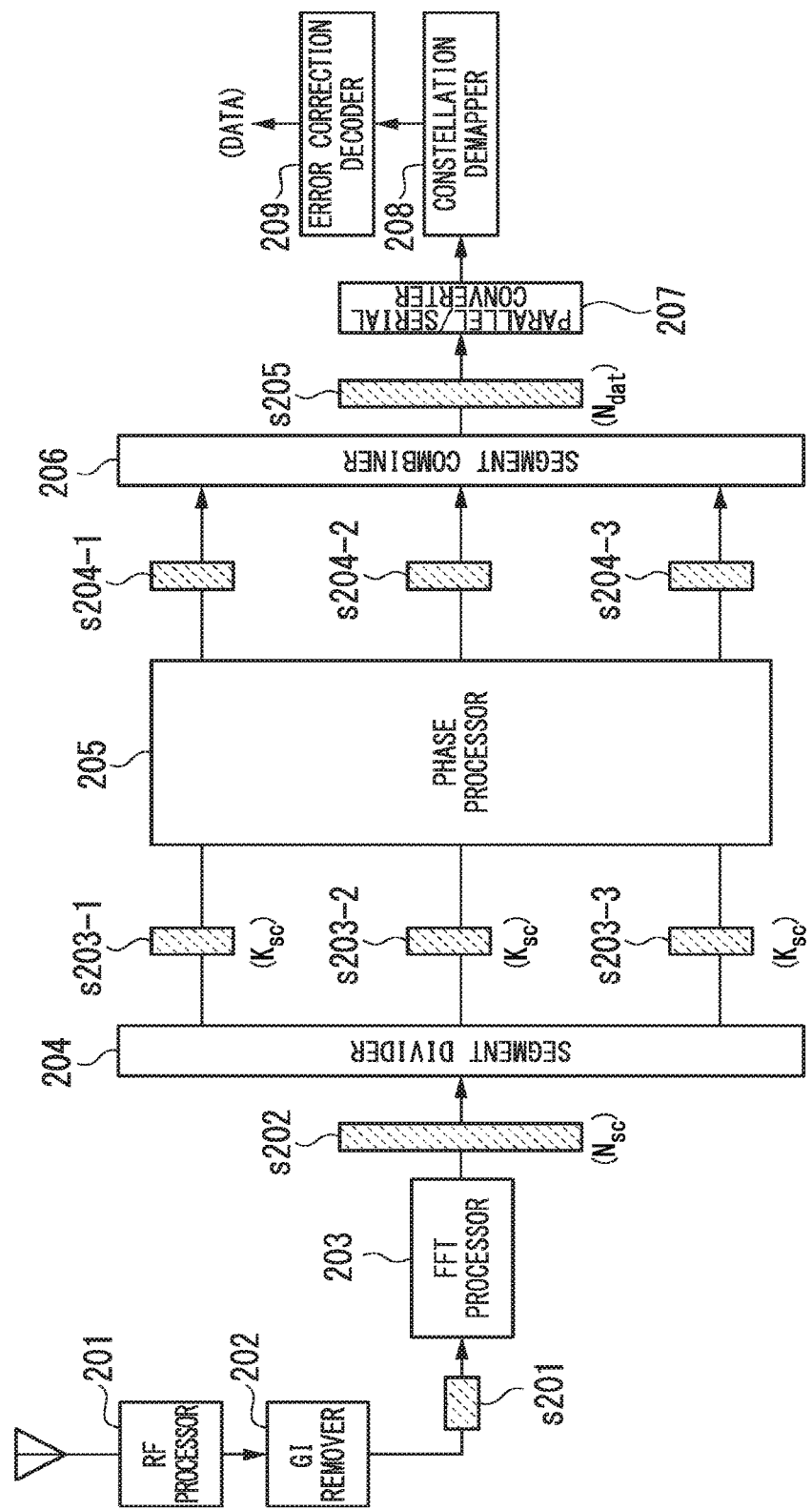
FIG. 2 is a block diagram illustrating the configuration regarding receiving in the wireless communication apparatus.

FIG. 2 is a block diagram illustrating the configuration regarding receiving in the wireless communication apparatus 200 of the first embodiment. As shown in this drawing, the wireless communication apparatus 200 has an RF processor 201, a GI remover 202, an FFT processor 203, a segment divider 204, a phase processor 205, a segment combiner 206, a parallel/serial converter (P/S converter) 207, a constellation demapper 208, and an error correction decoder 209. In this drawing, the hatched rectangles to which the reference symbols s201, s202, s203-1, s203-2, s203-3, s204-1, s204-2, s204-3, and s205 are applied indicate signals in the wireless communication apparatus 200. The wireless communication apparatus 200 receives a signal transmitted from the wireless communication apparatus 100 and acquires data included in the signal.

The RF processor 201 acquires the signal received by an antenna, performs received signal processing to the signal, and supplies GI remover 202 with a digital baseband signal obtained by the received signal processing. The received signal processing in the RF processor 201 includes, for example, low-noise amplification, filtering that extracts the OFDM frequency band, and down-conversion from the wireless frequency to the baseband frequency. The GI remover 202 removes the guard interval from the digital baseband signal. The GI remover 202 supplies the FFT processor 203 with the signal s201, which was obtained by removing the guard interval.

The FFT processor 203 transforms the signal s201 from a time-domain signal to a frequency-domain signal. The FFT processor 203 performs an Nsc-point FFT of the signal s201 to transform the signal s201 into parallel symbol stream s202 that includes the symbols of each of the subcarriers included in the signal s201. The FFT processor 203 supplies the parallel symbol stream s202 to the segment divider 204. The signal transformation by the FFT processor 203 is performed for each OFDM symbol.

The segment divider 204 divides the parallel symbol stream s202 into the Nseg-segment symbol streams s203-1, s203-2, and s203-3. The segment divider 204 performs the same division as performed by the segment divider 105 in the wireless communication apparatus 100. The subcarriers included in each of the segments are the same between the wireless communication apparatus 100 and the wireless communication apparatus 200. The segment divider 204 supplies the symbol streams s203-1, s203-2, and s203-3 of each segment to the phase processor 205.

The phase processor 205, based on the pilot symbols respectively included in the symbol streams s203-1, s203-2, and s203-3 of the first, second, and third segments, estimates the transmission path response between the wireless communication apparatus 100 and its own apparatus. The phase processor 205, based on the pilot symbols respectively included in the symbol streams s203-1, s203-2, and s203-3 of the first, second, and third segments, estimates the phase rotation amount that was performed to each segment in the wireless communication apparatus 100. The phase rotation pattern 205 cancels the phase rotation that was performed to each of the symbol streams s203-1, s203-2, and s203-3 and also equalizes the influence received in the transmission path. The phase rotation pattern 205 supplies the symbol streams s204-1, s204-2, and s204-3 obtained by the phase rotation canceling and equalization to the segment combiner 206. Because the phase processor 205 removes the pilot symbols from the symbol streams s203-1, s203-2, and s203-3, the sum of the number of modulation symbols included in the symbol streams s204-1, s204-2, and s204-3 is Ndat.

The segment combiner 206 combines the symbol streams s204-1, s204-2, and s204-3 to generate a combined symbol stream s205 in which Ndat modulation symbols are made parallel. The segment combiner 206 supplies the combined symbol stream s205 to the parallel/serial converter 207. The parallel/serial converter 207 converts the combined symbol stream s205 into a single stream of modulation symbols and supplies the obtained modulation symbol stream to the constellation demapper 208.

The constellation demapper 208 demodulates the modulation symbols included in the modulation symbol stream into a bit stream. The constellation demapper 208, by processing that is the inverse of the mapping in the constellation mapper 102, acquires a bit stream from the modulation symbols. The constellation demapper 208 supplies the bit stream obtained by demodulation to the error correction decoder 209. The error correction decoder 209 performs error detection and error correction of the bit stream and outputs the demodulated bit stream as data.

Figure 3:
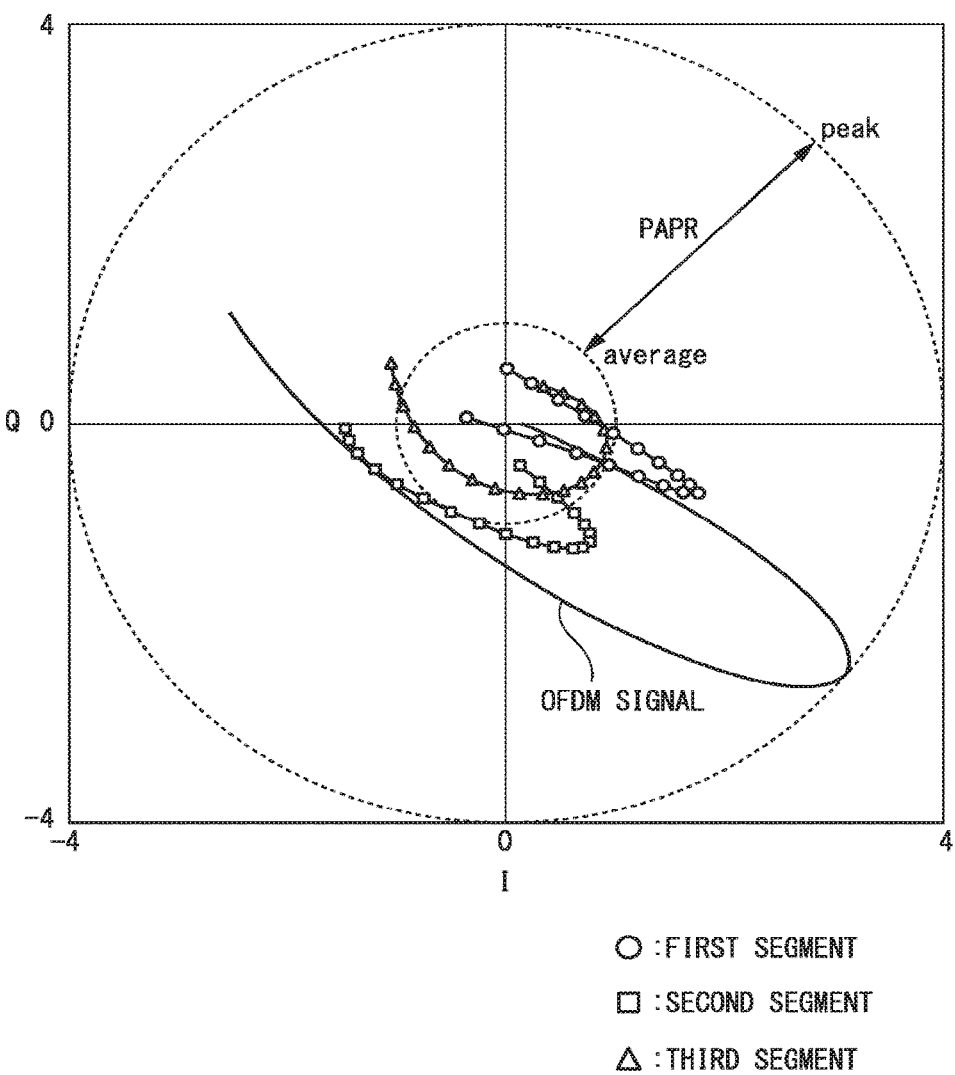
FIG. 3 is a graph illustrating the change with time of a time-domain signal and an OFDM signal when PTS is not applied.
Figure 4:
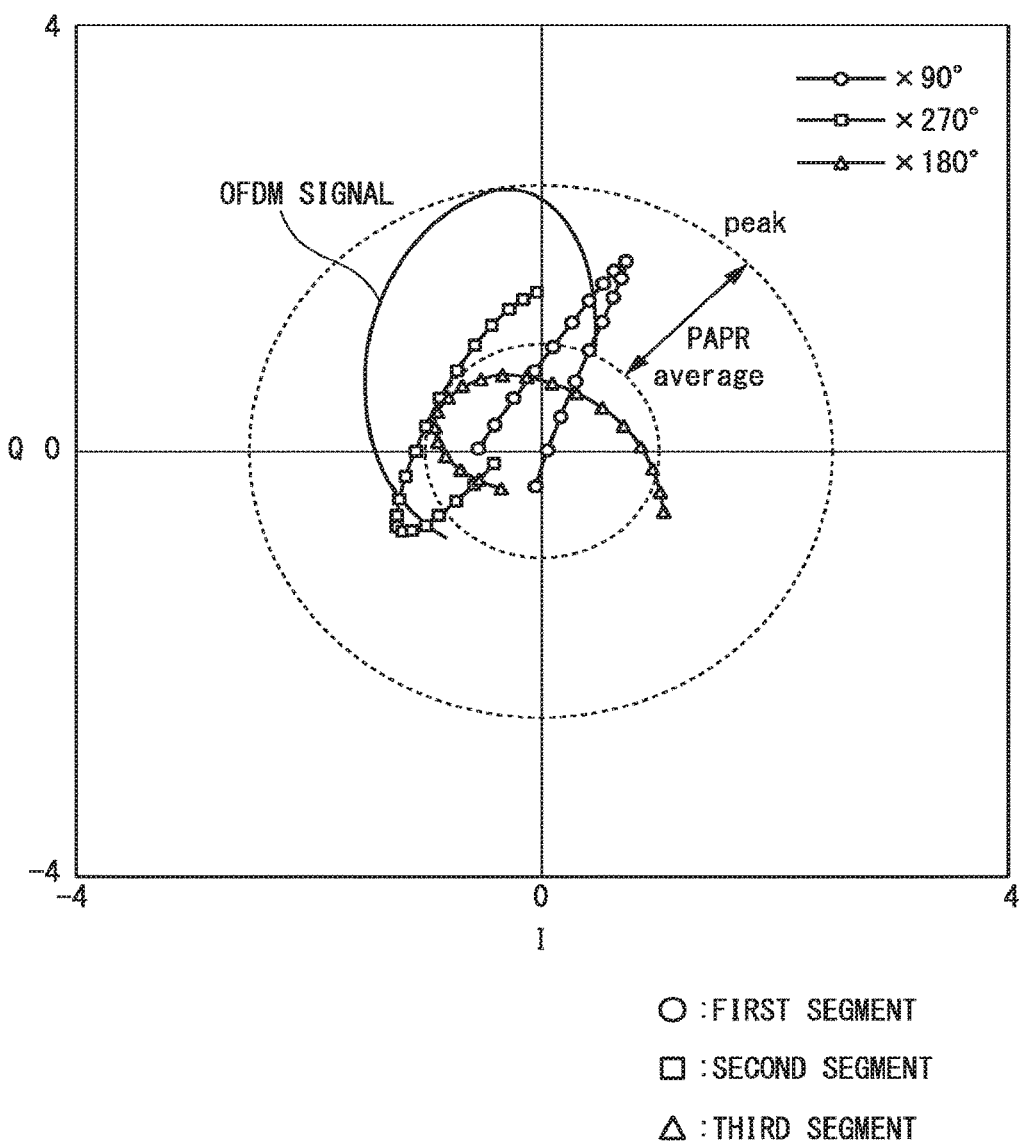
FIG. 4 is a graph illustrating the change with time of a time-domain signal and an OFDM signal when PTS has been applied.
Figure 20:
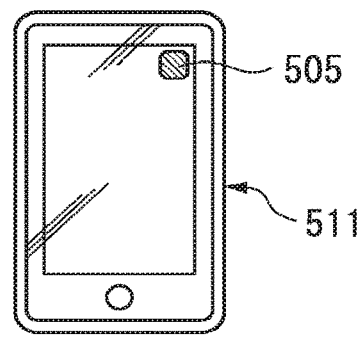
FIG. 20 is a second outer view of the wireless communication apparatus.

The principle of reducing the PAPR by PTS will now be described for case in which the number of segments is 3. FIG. 3 is a graph illustrating the change with time of a time-domain signal to which PTS is not applied. FIG. 4 is a graph illustrating the change with time of a time-domain signal to which PTS has been applied. The time-domain signal corresponds to the time-domain signals s104-1 to s104-3 in FIG. 1. The OFDM signal corresponds to the OFDM signal s105 in FIG. 1. In FIG. 3 and FIG. 4, 20 samples of each time-domain signal of the three segments, the first, second, and third segments, are plotted, with plots at adjacent sampling times connected by lines.

Because a time-domain signal is a complex value, it is represented as a trace by plotting the samples on the complex plane. If PTS is not applied as shown in FIG. 3, the result that has been obtained by simply adding the time-domain signal of the first, second, and third segments is the OFDM signal. In the example shown in FIG. 3, the traces of the time-domain signals of the first, second and third segments are the same phase, and the peak of the OFDM signal after the addition is increased. The ratio between the average value and the peak value of the OFDM signal, that is, the PAPR, also increases.

In contrast, in the case in which PTS was applied, as shown in FIG. 4, the result of performing a phase rotation to and adding the time-domain signals of the first, second, and third segments is the OFDM signal. In the example shown in FIG. 4, phase rotations of 90 degrees, 270 degrees, and 180 degrees are performed to the time-domain signals of the first, second, and third segments, respectively. As a result, the phases of the time-domain signal are almost reversed, and the peak and PAPR of the OFDM, which is the waveform after addition, are reduced. With PTS, combination patterns C with various phase rotations are generated and the PAPR is evaluated when each of the combination patterns C is applied to the divided symbol streams. As a result of the evaluation, the OFDM signal having the minimum PAPR is transmitted.

Figure 5:
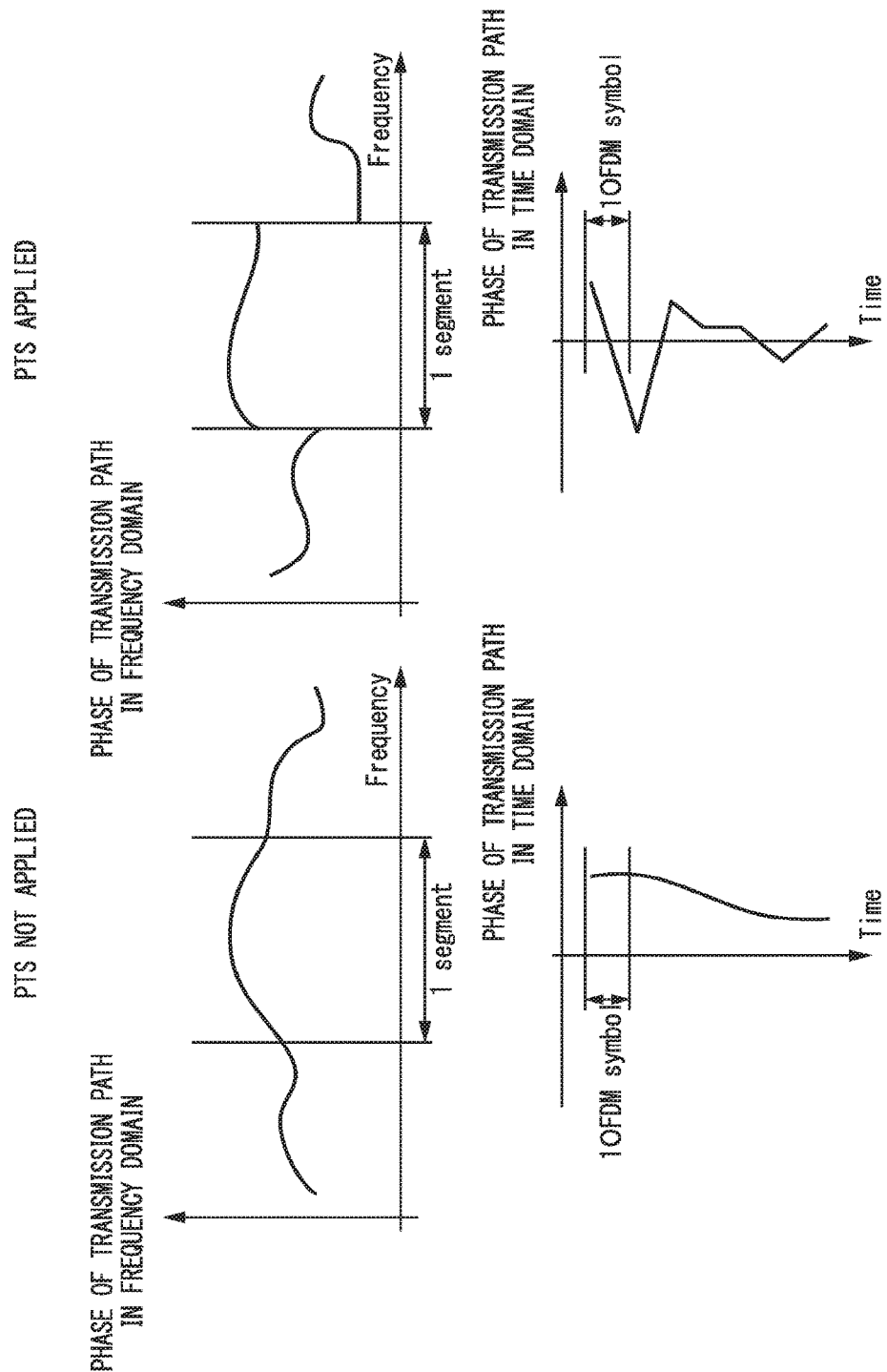
FIG. 5 is a drawing illustrating the necessity for a wireless communication apparatus to acquire the phase rotation amount by PTS and the phase rotation amount in the wireless transmission path.

FIG. 5 shows the necessity for the wireless communication apparatus 100 acquiring the phase rotation amount by PTS and the phase rotation amount in the wireless transmission path. FIG. 5 shows, for the case in which PTS is applied and the case in which PTS is not applied, the response, which the OFDM signal received in the transmission path, in the frequency domain and the time domain. In the graph showing the response in the frequency domain, the horizontal axis represents frequency, and the vertical axis represents the transmission path response. In the graph showing the response in the time domain, the horizontal axis represents the phase of the transmission path response, and the vertical axis represents time. Although the transmission path response is generally represented by a complex number, in this case the real part is used for a schematic representation. In the two graphs for the case in which PTS was applied, the phase rotation by PTS is treated as a part of the transmission path response. Because the phase rotation in the transmission path response in the frequency domain in the case is which PTS was applied is given independently for each segment, a discontinuous change occurs in the frequency direction at the boundary between segments. Because in the transmission path response in the time domain in the case of applying PTS a phase rotation is given for each OFDM symbol separately, a discontinuous change occurs in the time direction at the boundary between OFDM symbols.

In general, in wireless communication using the OFDM system, scattered pilot (SP) symbols placed periodically in the frequency direction and the time direction are used, and the transmission path response of subcarriers at which SP symbols are placed is estimated. Based on the estimated transmission path response, the transmission path of subcarriers at which SP symbols are not placed is calculated by interpolation. As described above, if the phase rotation by PTS is treated as part of the transmission path response, discontinuous changes occur in both the frequency direction and the time direction. Because of this discontinuity, it becomes difficult at the receiving-side apparatus to interpolate the transmission path response in a subcarrier in which a pilot symbol is not placed. Therefore, the receiving-side apparatus must estimate the phase rotation amount by PTS and the phase rotation amount by the transmission path response and suppress the influence of discontinuity in the interpolation of the transmission path response.

Figure 6:
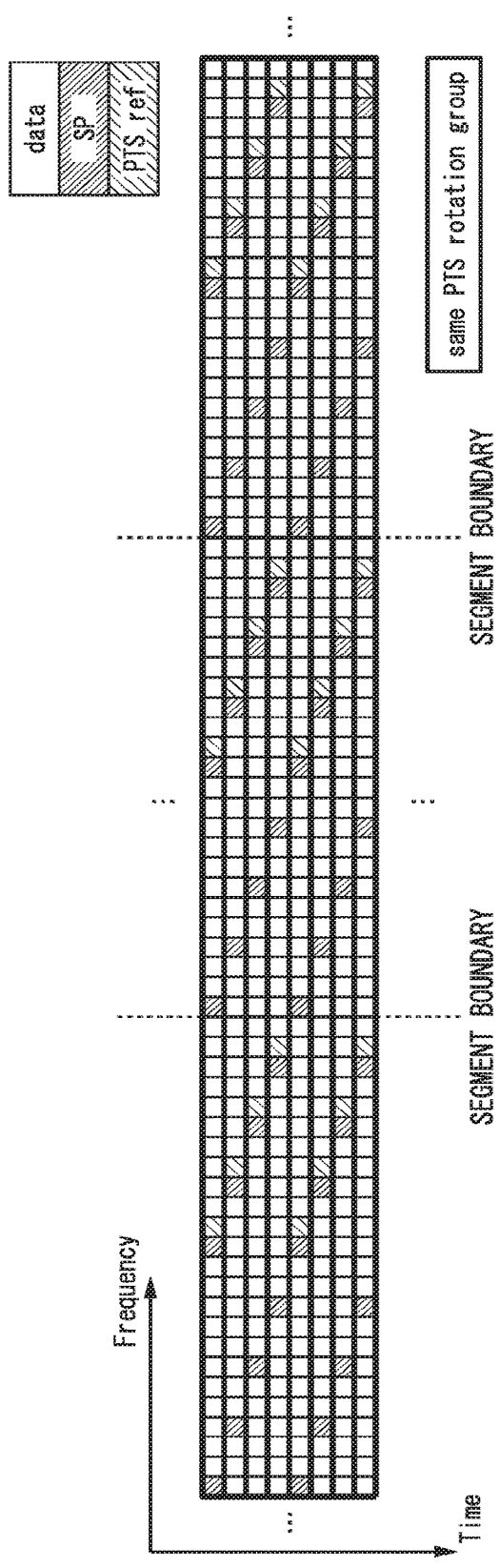
FIG. 6 is a drawing illustrating an example of placement of pilot symbols.

FIG. 6 shows an example of the placement of pilot symbols in the first embodiment. In this drawing, the horizontal axis represents frequency, and the vertical axis represents time. In this drawing, the regions formed by partitioning in the frequency direction and in the time direction represent wireless resources. The wireless resources are uniquely identified by a combination of a subcarrier and a time. In this drawing, one of data, an SP symbol, and a reference symbol is placed at each wireless resource. A reference symbol (PTS ref) is a type of pilot symbol and is a predetermined symbol used for estimating the phase rotation amount performed to a segment. In this drawing, Wireless resources surrounded by bold lines are wireless resources to which the same phase rotation is performed by PTS. The SP symbols are periodically placed at wireless resources in the frequency direction and the time direction. One reference symbol is placed at each segment. In the example shown in FIG. 6, the reference symbols are placed at wireless resources that are adjacent in the frequency direction to wireless resources at which SP symbols are placed. However, if at least one reference symbol is placed in each segment, they may be placed at wireless resources that are not adjacent in the frequency direction to wireless resources at which SP symbols are placed.

Figure 7:
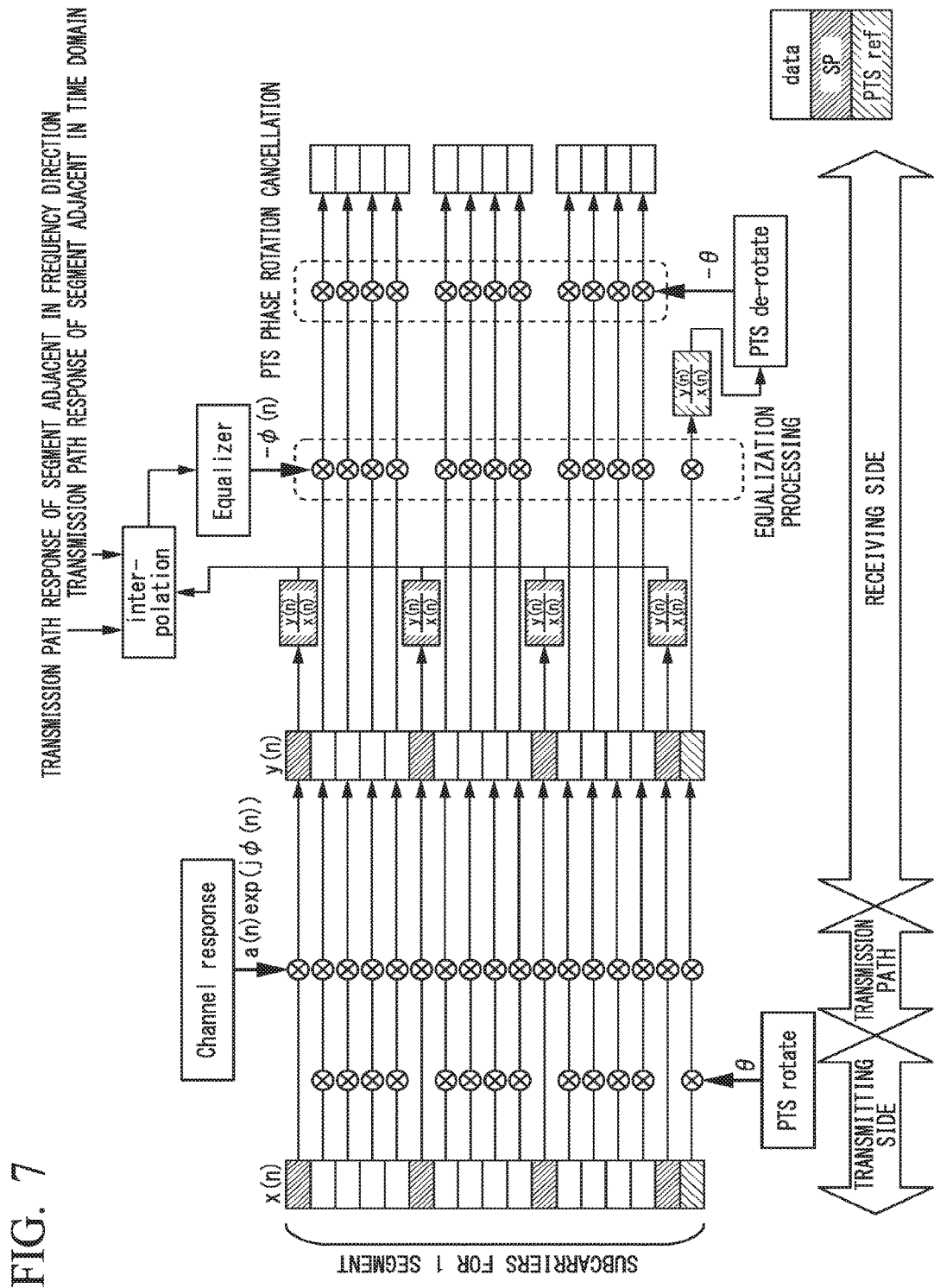
FIG. 7 is a drawing illustrating the processes of imparting, and canceling, and equalizing PTS phase rotation.

FIG. 7 shows the processes of imparting and canceling the PTS phase rotation, and equalization. This drawing shows the phase changes in each of the transmitting-side wireless communication apparatus 100, the transmission path, and receiving-side wireless communication apparatus 200. In the transmitting-side wireless communication apparatus 100, each of the partial waveform shapers 106-1, 106-2, and 106-3, in order to reduce the PAPR, performs a phase rotation of θ to symbols in subcarriers, of subcarriers within segments, in which data and reference symbols are placed. Each of the partial waveform shapers 106-1, 106-2, and 106-3, of the subcarriers in the segments, does not perform a phase rotation by PTS to symbols of subcarriers at which SP symbols are placed. An OFDM signal is generated by adding the time-domain signals s104-1, s104-2, and s104-3 respectively output from the partial waveform shapers 106-1, 106-2, and 106-3.

In the transmission path, the OFDM signal is subjected to phase rotation in response to the frequency. If the phase rotation occurring in a subcarrier having the subcarrier number n (n=1, 2, . . . , Nsc) is expressed as $\phi(n)$ and the change of the amplitude occurring in the subcarrier having the subcarrier number n is expressed as $a(n)$, the transmission path response (channel response) of the subcarrier number n is expressed as $a(n) \exp(j\phi(n))$.

In the wireless communication apparatus 200, the phase processor 205 estimates the transmission path responses of subcarriers in which SP symbols are placed. The estimated values of the transmission path responses are obtained by dividing the received signal y(n) of a subcarrier in which the SP symbol is placed by the predetermined pilot symbol x(n). The transmission path responses of a subcarriers in which SP symbols are placed are obtained by the division results of (y(n)/x(n)). The phase processor 205 obtains the transmission path responses of subcarriers in which the SP symbol is not placed by interpolation, based on the obtained transmission path responses. When the phase processor 205 interpolates the transmission path responses of subcarriers in which the SP symbol is not placed, it uses interpolation in the frequency direction and interpolation in the time direction. The phase processor 205, for the interpolation in the frequency direction, uses the transmission path responses obtained for segments adjacent in the frequency direction. The phase processor 205, for the interpolation in the time direction, uses the transmission path responses obtained for segments adjacent in the time direction.

The phase processor 205, using the transmission path response obtained by estimation and interpolation, equalizes the signals of subcarriers in which data and reference symbols are placed. In the equalization processing shown in FIG. 7, to focus on the phase, the processing of multiplying by $-\phi(n)$ is shown. In the equalization processing, the change $a(n)$ with respect to the amplitude is also canceled. By performing equalization processing, the signal of a subcarrier in which a reference symbol is placed becomes a signal to which a phase rotation θ is performed by PTS. Therefore, the phase rotation θ by PTS is calculated by dividing a signal of a subcarrier in which a reference symbol is placed by a predetermined reference symbol.

Specifically, similar to the calculation when estimating the transmission path response, y(n)/x(n) is calculated, and a phase rotation amount θ is obtained by calculating the complex deviation angle indicated by the result. The calculated phase rotation amount θ is quantized by the PTS effective phase. For example, if the angle deviation is 89° in the case in which the PTS phase candidates are restricted to [+1, +j, −1, −j], the phase rotation amount by PTS is 90° (+j). The phase processor 205, based on the obtained phase rotation amount θ, acquires the transmitted modulation symbol by canceling the phase rotation performed at the transmitting side to the signal of the subcarrier in which data is placed.

Figure 8:
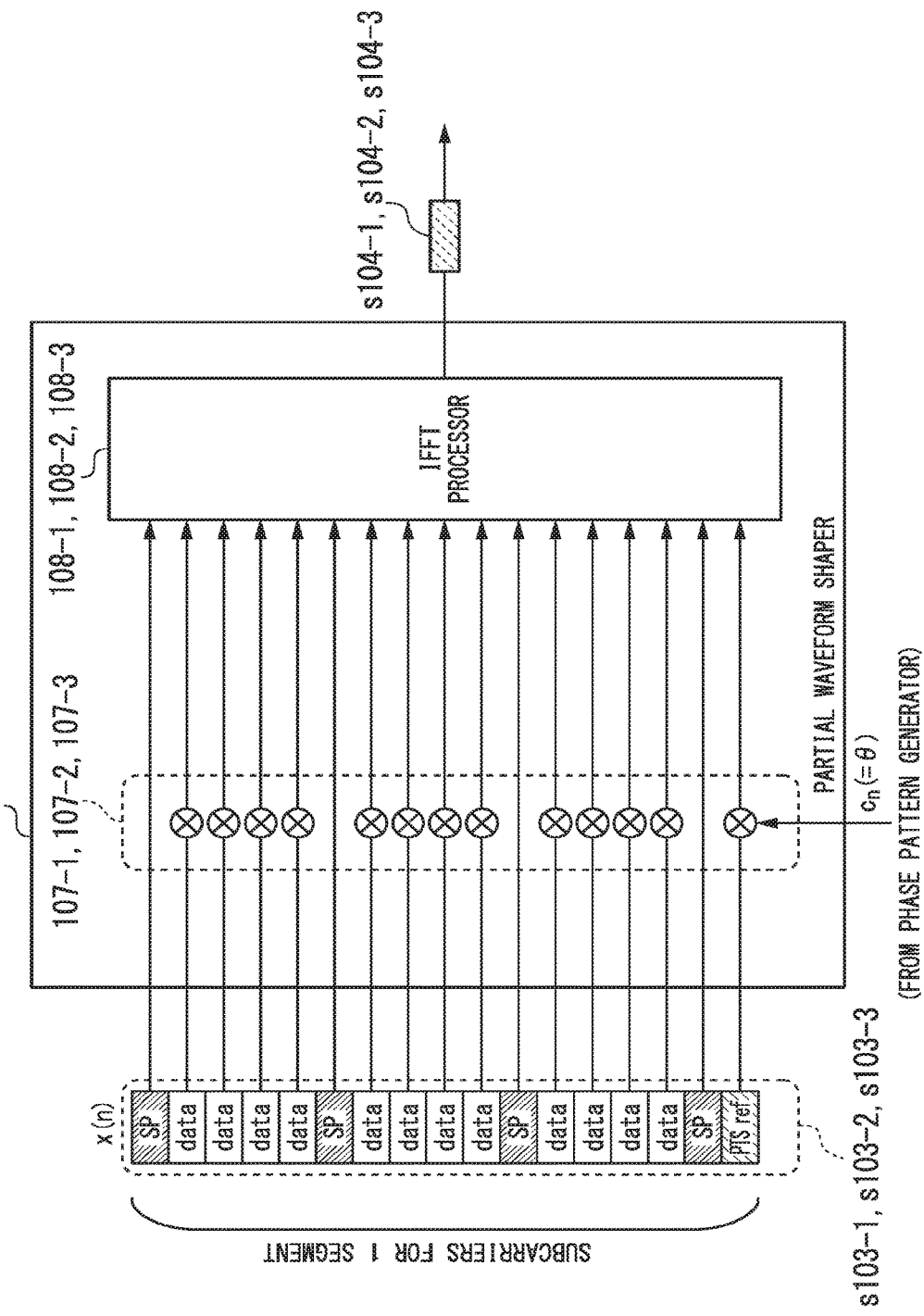
FIG. 8 is a block diagram illustrating the detailed configuration of a partial waveform shaper.

FIG. 8 is a block diagram illustrating the detailed configuration of the partial waveform shapers 106-1, 106-2, and 106-3 in the first embodiment. The partial waveform shaper 106-1 calculates the time-domain signal s104-1 from the divided symbol stream s103-1. In this calculation, phase rotation is done that performs a phase rotation amount $c_n$ (n=1, . . . . Nseg) to a signal of a subcarrier in which data or reference symbols is placed. Phase rotation by PTS is not performed a signal of subcarriers in which the SP symbol is not placed. In the partial waveform shapers 106-2 and 106-3, the same type of processing is performed as in the partial waveform shaper 106-1. The IFFT processors 108-1, 108-2, and 108-3 perform an inverse FFT each time PTS phase rotation pattern to the divided symbol streams s103-1, s103-2, and s103-3 is supplied.

Figure 9:
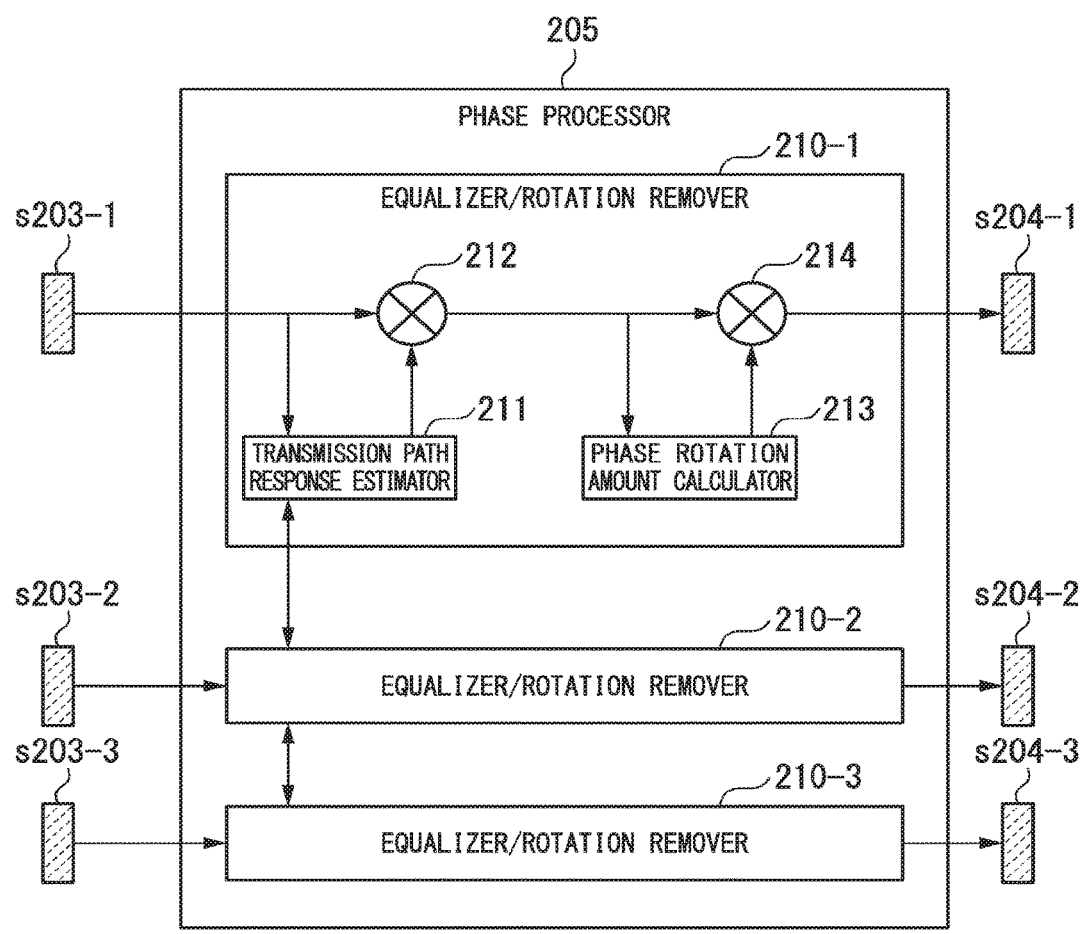
FIG. 9 is a block diagram illustrating the configuration of a phase processor.

FIG. 9 is a block diagram illustrating the configuration of the phase processor 205 in the first embodiment. As shown in this drawing, the phase processor 205 has equalizer/rotation removers 210-1, 210-2, and 210-3. The equalizer/rotation removers 210-1, 210-2, and 210-3 cancel the phase rotation to the symbol streams s203-1, s203-2, and s203-3 and equalize the symbol streams s203-1, s203-2, and s203-3 after the cancelation. The equalizer/rotation remover 210-1 has a transmission path response estimator 211, a first multiplier 212, a phase rotation amount calculator 213, and a second multiplier 214.

The transmission path response estimator 211 estimates the transmission path responses of subcarriers in which an SP symbol is placed, based on a predetermined SP symbol and a symbol of a subcarrier, in which the SP symbol is placed, included in the symbol stream s203-1. The transmission path response estimator 211 interpolates the transmission path responses of subcarriers in which the SP symbol is not placed, based on the estimated transmission path responses, the transmission path response in a segment adjacent in the frequency direction, and the transmission path response in the same segment in an OFDM symbol adjacent in the time direction. The transmission path response estimator 211 acquires the transmission path response in a segment adjacent in the frequency direction from other equalizer/rotation removers 210. The transmission path response estimator 211 stores, as the transmission path responses of the same segment in the OFDM symbol adjacent in the time direction, the transmission path responses interpolated with the estimated transmission path responses.

The transmission path response estimator 211 calculates the complex conjugate of the transmission path response of each subcarrier obtained by estimation and interpolation. The transmission path response estimator 211 supplies the calculated complex conjugates to the first multiplier 212. The first multiplier 212 multiplies each of the symbols included in the symbol stream 203-1 with the complex conjugate corresponding to the symbol. The result of the multiplication by the first multiplier 212 is a symbol stream with an equalized variation of the amplitude and phase in the transmission path.

The phase rotation amount calculator 213 calculates the phase rotation amount by PTS, based on a predetermined reference symbol and a symbol of a subcarrier in which a reference symbol is place, wherein the symbol is included in the symbol stream output from the first multiplier 212. The phase rotation amount calculator 213 calculates the complex scalar value $c_1^*$ that cancels the calculated phase rotation amount. The scalar amount $c_1^*$ is the complex conjugate of the phase rotation amount $c_1$ performed in the wireless communication apparatus 100 to each subcarrier included in the first segment. The phase rotation amount calculator 213 supplies the calculated scalar value $c_1^*$ to the second multiplier 214. The second multiplier 214 multiplies the symbol stream output from the first multiplier 212 by the scalar value $c_1^*$ and outputs the multiplication result as the symbol stream s204-1.

The equalizer/rotation removers 210-2 and 210-3 have the same elements as the equalizer/rotation remover 210-1. The equalizer/rotation removers 210-2 and 210-3, by performing the same processing as the processing performed by the equalizer/rotation remover 210-1, perform equalization and cancellation of the PTS phase rotation to the symbol streams 203-2 and 203-3, output the symbol streams s204-2 and s204-3.

Second Embodiment

Figure 10:
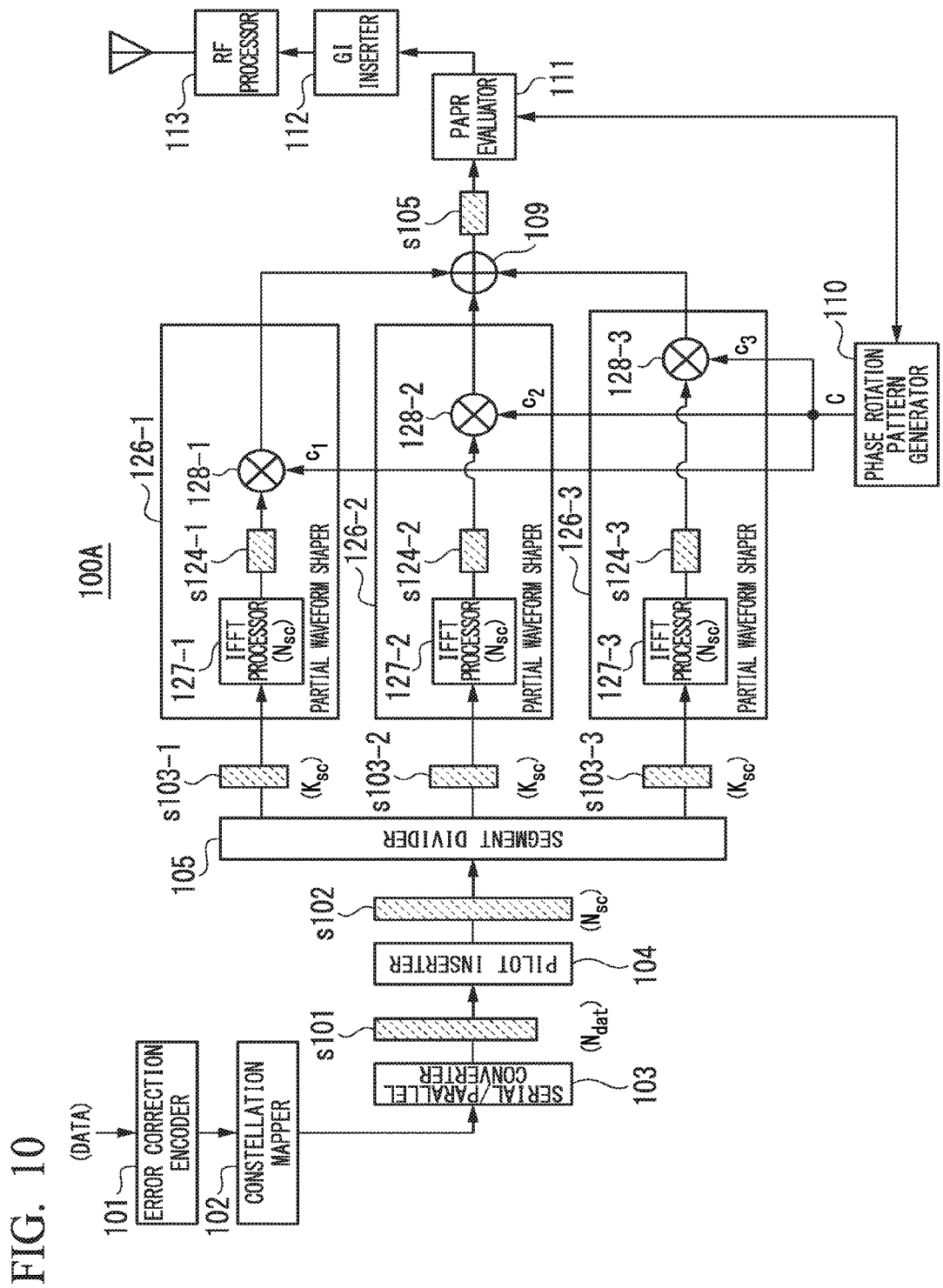
FIG. 10 is a block diagram illustrating the configuration regarding transmission in the wireless communication apparatus in a second embodiment.

FIG. 10 is a block diagram illustrating the configuration regarding transmitting in the wireless communication apparatus 100A in the second embodiment. The wireless communication apparatus 100A, similar to the wireless communication apparatus 100 in the first embodiment, reduces the PAPR by performing phase rotation to signals of each segment. As shown in this drawing, the wireless communication apparatus 100A has an error correction encoder 101, a constellation mapper 102, a serial/parallel converter (S/P converter) 103, a pilot inserter 104, a segment divider 105, partial waveform shapers 126-1, 126-2, and 126-3, an adder 109, a phase rotation pattern generator 110, a PAPR evaluator 111, a GI inserter 112, and an RF processor 113.

The wireless communication apparatus 100A is different from the wireless communication apparatus 100 of the first embodiment by having partial waveform shapers 126-1, 126-2, and 126-3 in place of the partial waveform shapers 106-1, 106-2, and 106-3. In the wireless communication apparatus 100A, element that are the same as elements in the wireless communication apparatus 100 are assigned the same reference symbols and the duplicated descriptions thereof will be omitted. The partial waveform shaper 12601 has an IFFT processor 127-1 and a multiplier 128-1. The partial waveform shaper 126-2 has an IFFT processor 127-2 and a multiplier 128-2. The partial waveform shaper 126-3 has an IFFT processor 127-3 and a multiplier 128-3.

In the partial waveform shaper 126-1, the IFFT processor 127-1 transforms the divided symbol stream s103-1 input from the segment divider 105 from a frequency-domain signal to a time-domain signal. The IFFT processor 127-1 performs a Nsc-point inverse FFT on the divided symbol stream s103-1 to transform the divided symbol stream s103-1 into the time-domain signal s124-1. The IFFT processor 127-1 supplies the time-domain signal s124-1 to the multiplier 128-1.

The multiplier 128-1 multiplies the time-domain signal s124-1 by the complex scalar value $c_1$ and supplies the multiplication result to the adder 109. The complex scalar value $c_1$ is supplied from the phase rotation pattern generator 110 to the multiplier 128-1. The multiplier 128-1 multiplies the time-domain signal 124-1 by the scalar value $c_1$ to perform a phase rotation expressed by the scalar value $c_1$ to the signals of predetermined subcarriers included in the first segment.

In the partial waveform shaper 126-2 and 126-3, the IFFT processor 127-2 and 127-3 and the multipliers 128-2 and 128-3 operate the same way as the IFFT processor 127-1 and the multiplier 128-1. That is, transformation by an inverse FFT and multiplication by the complex scalar values $c_2$ and $c_3$ are performed to the divided symbol streams s103-2 and s103-3. The result of multiplying the time-domain signal 124-2 by the scalar value $c_2$ and the result of multiplying the time-domain signal 124-3 by the scalar value $c_3$ are supplied to the adder 109. The adder 109 adds the multiplication results respectively supplied from the partial waveform shapers 126-1, 126-2, and 126-3 and supplies the result of the addition to the PAPR evaluator 111 as the OFDM signal s105.

In the second embodiment, the pilot inserter 104 inserts a reference symbol into a subcarrier that is adjacent to a subcarrier in which an SP symbol is inserted. In the second embodiment, adjacent subcarriers are subcarriers that are neighboring or that have a difference between the center frequencies of which that is within a predetermined range, and that have transmission path response with a high correlation. The configuration regarding receiving in the wireless communication apparatus 100A in the second embodiment is the same as the configuration in the wireless communication apparatus 200 shown in FIG. 2.

Figure 11:
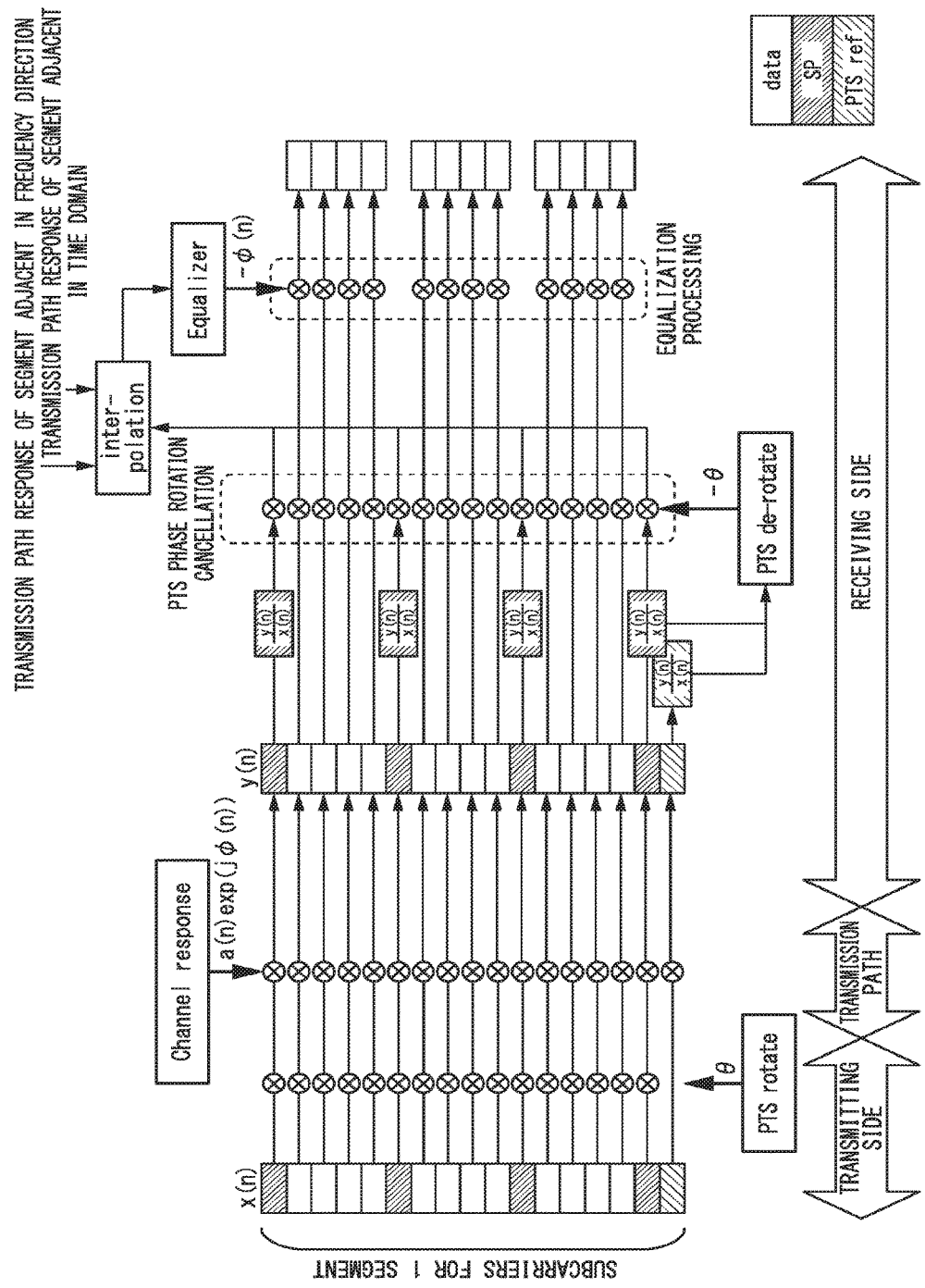
FIG. 11 is a drawing illustrating the processes of imparting, and canceling, and equalizing PTS phase rotation.

FIG. 11 shows the processes of imparting and canceling the PTS phase rotation, and equalization in the second embodiment. This drawing shows the phase changes in each of the transmitting-side wireless communication apparatus 100A, the transmission path, and the receiving-side wireless communication apparatus 200. In the transmitting-side wireless communication apparatus 100A, each of the partial waveform shapers 126-1, 126-2, and 126-3, in order to reduce the PAPR, performs a phase rotation with phase of θ to symbols in subcarriers in which data and SP symbols are placed, wherein the subcarriers are included in the segment. Each of the partial waveform shapers 126-1, 126-2, and 126-3 does not perform a phase rotation by PTS a symbol of subcarrier at which the reference symbol is placed, wherein the subcarrier is included in the segment. An OFDM signal is generated by adding the multiplication results respectively output from the partial waveform shapers 126-1, 126-2, and 126-3.

In the transmission path, all subcarrier components of the OFDM signal are subjected to phase rotation, with the phase rotation amount $\phi(n)$ (n=1, 2, . . . , Nsc), in response to the frequency. The OFDM signal is also subjected to a change a(n) of the amplitude, in response to the frequency, to all subcarrier components. The transmission path response (channel response) of the subcarrier number n is expressed as a(n) exp(j$\phi$(n)).

In the wireless communication apparatus 200, the phase processor 205 estimates the phase rotation amount θ on each of the segments, based on a received signal of a subcarrier in which a reference symbol was placed and a received signal of a subcarrier adjacent to the subcarrier and in which an SP symbol was placed. The correlation of the transmission path responses of two adjacent subcarriers is high, and the phase rotations $\phi(n)$ occurring in the each subcarrier in the transmission path can be treated as being substantially equal. Therefore, by the difference between the phase rotation $\phi(n)$ of a subcarrier in which a reference symbol was placed and the phase rotation $\phi(n)$ of a subcarrier in which the SP symbol was placed, the phase rotation amount θ by PTS phase rotation can be estimated. The phase processor 205, based on the estimated phase rotation amount θ, cancels the PTS phase rotation that has been performed to a signal of each subcarrier in which data or an SP symbol has been placed.

The phase processor 205 estimates the transmission path response of subcarrier based on a predetermined pilot symbol and symbols of each of subcarriers in which the SP symbol is placed, wherein the symbols have been canceled the PTS phase rotation. The phase processor 205, by interpolation based on the estimated transmission path response, acquires the transmission path response of subcarriers into which the SP symbol is not placed. The interpolation of the transmission path response is the same as the interpolation in the first embodiment. The phase processor 205, using the transmission path response obtained by estimation and interpolation, equalizes the signal of a subcarrier in which data is placed. In the equalization processing shown in FIG. 11, to focus on the phase, the processing of multiplying by −$\phi(n)$ is shown. In the equalization processing, the change a(n) with respect to the amplitude is also canceled. The phase processor 205 performs equalization to acquire the transmitted modulation symbols.

Figure 12:
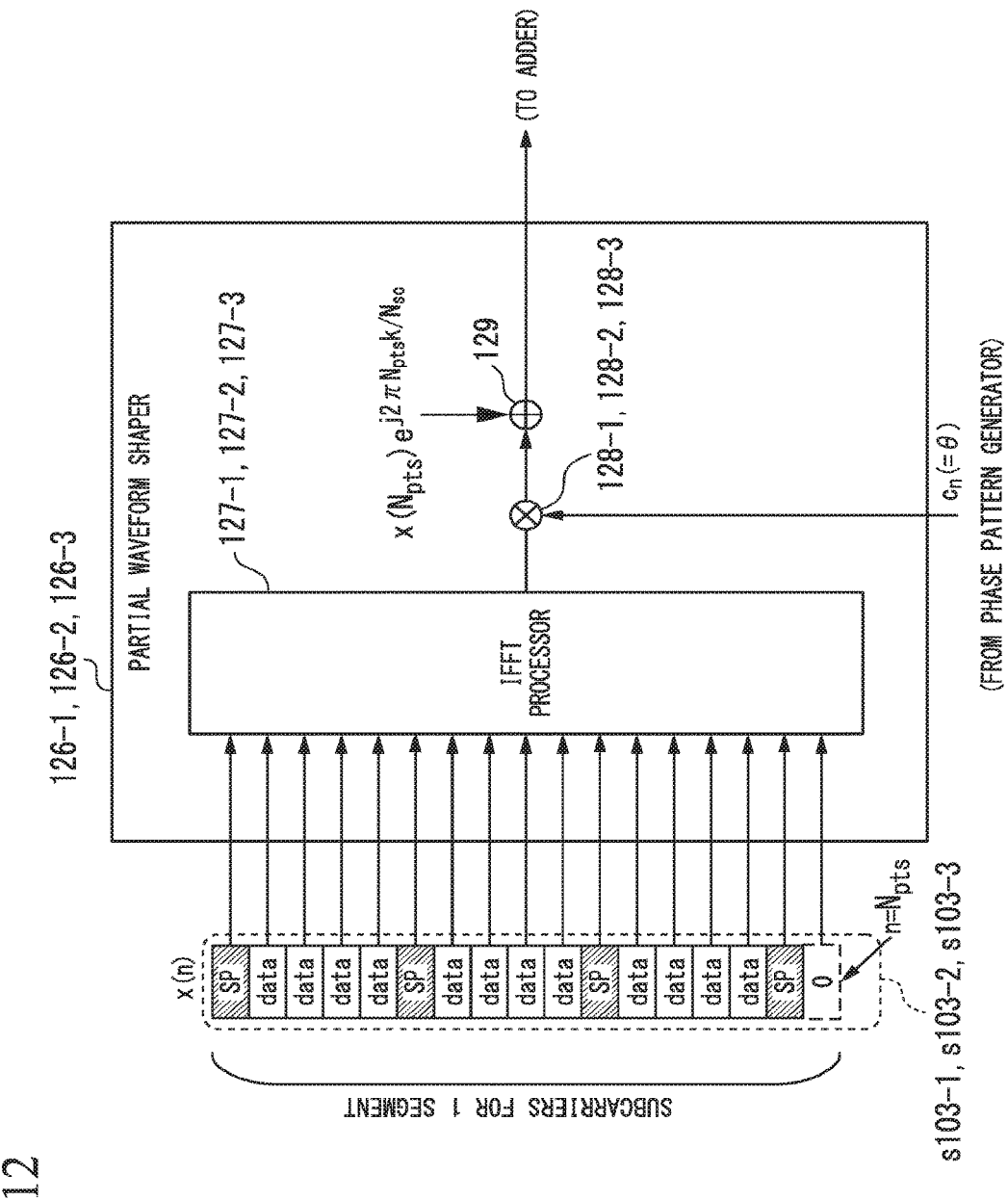
FIG. 12 is a block diagram illustrating a different configuration of a partial waveform shaper.

FIG. 12 is a block diagram illustrating a different configuration of the partial waveform shapers 126-1, 126-2, and 126-3 in the second embodiment. As shown in this drawing, the partial waveform shaper 126-1, in addition to having the IFFT processor 127-1 and the multiplier 128-1, may further have an adder 129. The partial waveform shaper 126-2 and 126-3, in the same manner, may further have the adder 129. If the wireless communication apparatus 100A includes the partial waveform shapers 126-1, 126-2, and 126-3 shown in FIG. 12, in order that a PTS phase rotation not be performed to the reference symbol (PTS ref), the pilot inserter 104 places a 0 (zero) symbol in a subcarrier in which is placed reference symbol in the divided symbol streams s103-1, s103-2, and s103-3. In the partial waveform shapers 126-1, 126-2, and 126-3, the adder 129 adds a time-domain signal corresponding to a reference symbol to a time-domain signal to which phase rotation of θ has been performed by the multipliers 128-1, 128-2, and 128-3. The adder 129 supplies the addition result to the adder 109, which is connected to the partial waveform shapers 126-1, 126-2, and 126-3.

If the subcarrier number of a subcarrier in which a reference symbol is to be placed is $N_{pts}$ and the value (complex) of the reference symbol is $x(N_{pts})$, the time-domain signal corresponding to the reference symbol is a sine wave expressed as $x(N_{pts})$ exp $(j2\pi N_{pts}k/N_{sc})$, where k is a variable indicating a time sample. In partial waveform shapers 126-1, 126-2, and 126-3 configured as shown in FIG. 12, even if the phase rotation amount θ performed to reduce the PAPR changes, it is not necessary to perform an inverse FFT computation again. For that reason, the amount of computation when determining the phase rotation pattern is reduced, and the time required to generate the OFDM signal is shortened.

Figure 13:
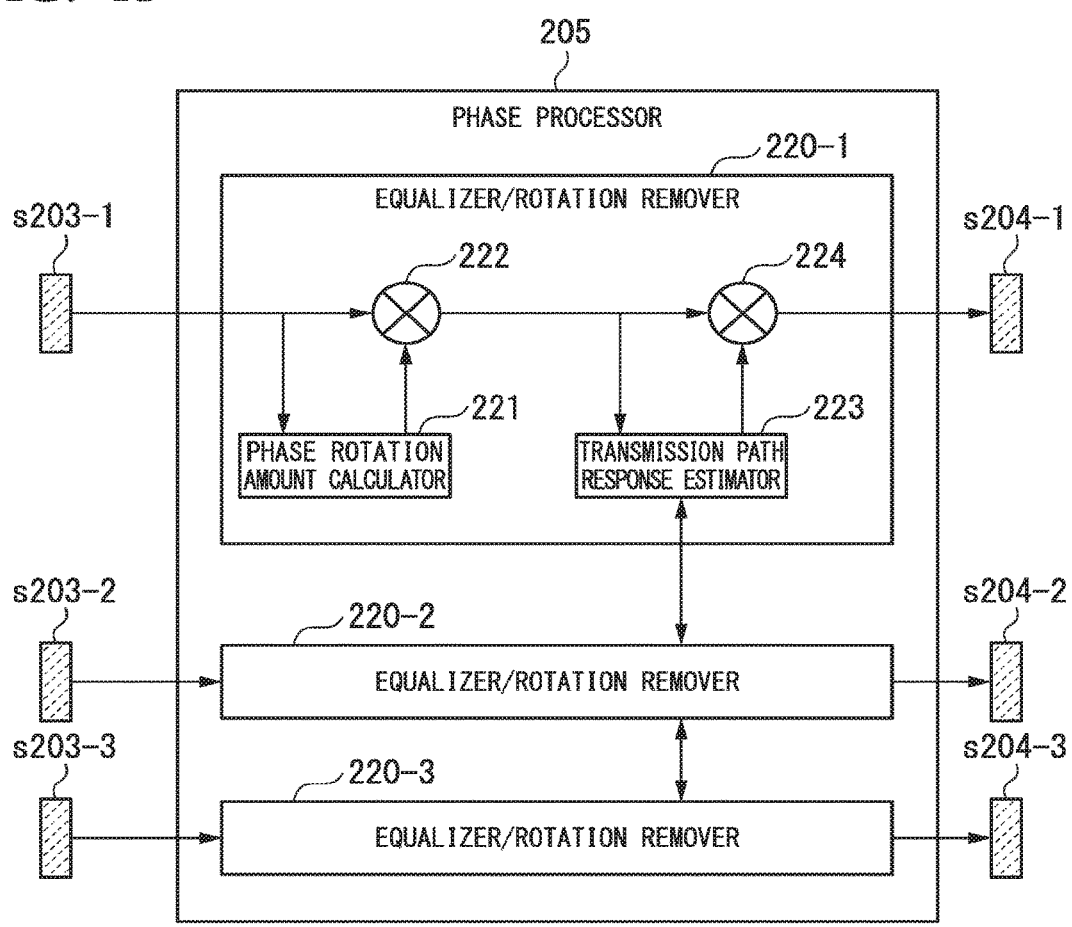
FIG. 13 is a block diagram illustrating the configuration of a phase processor.

FIG. 13 is a block diagram illustrating the configuration of the phase processor 205 in the second embodiment. As shown in this drawing, the phase processor 205 has equalizer/rotation removers 220-1, 220-2, and 220-3. The equalizer/rotation removers 220-1, 220-2, and 220-3 each perform canceling the phase rotation to the symbol streams s203-1, s203-2, and s203-3 and equalization. The equalizer/rotation remover 220-1 has a phase rotation amount calculator 221, a first multiplier 222, a transmission path response estimator 223, and a second multiplier 224.

The phase rotation amount calculator 221 calculates the PTS phase rotation amount, based on the symbols included in the symbol stream s203-1 in the first segment. The phase rotation amount calculator 221 uses a symbol of a subcarrier in which a reference symbol is place and a symbol in which an SP symbol adjacent to that subcarrier is placed in performing this calculation. The phase rotation amount calculator 221 calculates the complex scalar value $c_1$* that cancels the calculated phase rotation amount, and supplies the scalar value $c_1$* to the first multiplier 222. The first multiplier 222 multiplies each of the symbols included in the symbol stream 203-1 by the scalar value $c_1$*. The result of the multiplication by the first multiplier 222 is a symbol stream in which the PTS phase rotation has been canceled.

The transmission path response estimator 223, based on a predetermined pilot symbol and a symbol, of a symbol stream output from the first multiplier 222, of subcarrier in which the SP symbol was placed, estimates the transmission path response of a subcarrier in which the SP symbol was placed. The transmission path response estimator 223 interpolates the transmission path response of subcarriers in which the SP symbol is not placed, based on the estimated transmission path response, the transmission path response in an adjacent segment in the frequency direction, and the transmission path response in the same segment in an adjacent OFDM symbol in the time direction. The transmission path response estimator 223 acquires the transmission path response in an adjacent segment in the frequency direction from other equalizer/rotation removers. The transmission path response estimator 223 stores the estimated transmission path response and the interpolated transmission path response as the transmission path response of the same segment in the OFDM symbol adjacent in the time direction.

The transmission path response estimator 223 calculates the complex conjugate of the transmission path response of each subcarrier obtained by estimation and interpolation and supplies the calculated complex conjugates to the second multiplier 224. The second multiplier 224 multiplies each of the symbols included in the symbol stream output from the first multiplier 222 by the complex conjugate of the corresponding subcarrier. The result of the multiplication by the second multiplier 224 is a symbol stream in which the amplitude and phase variations in the transmission path response have been equalized. The result of the multiplication by the second multiplier 224 is output as the symbol stream s204-1.

The equalizer/rotation removers 220-2 and 220-3 have the same configuration as the equalizer/rotation remover 220-1. By performing the same processing as performed in the equalizer/rotation remover 220-1, the equalizer/rotation removers 220-2 and 220-3 perform PTS phase rotation cancellation and equalization to the symbol streams s203-2 and s203-3, and output the symbol streams s204-2 and s204-3.

A wireless communication system having the wireless communication apparatus 100A and the wireless communication apparatus 200 of the second embodiment, by performing phase rotation by PTS to SP symbols as well, can improve the PAPR reduction performance. In wireless communication by the OFDM system, the number of subcarrier in which the SP symbol is placed occupies several percent of the total number of subcarriers. One reference symbol can be placed in each segment. A plurality of reference symbols may be placed in each segment. However, in each segment, because the number of reference symbols is smaller than the number of SP symbols, the configuration of the second embodiment, in which a PTS phase rotation is performed to symbols of a subcarrier in which the SP symbol is placed, it might be possible to improve the PAPR compared to the configuration of the first embodiment.

Third Embodiment

The configuration regarding transmission in the wireless communication apparatus 100A in the third embodiment is the same as the configuration regarding transmission in the wireless communication apparatus 100A shown in FIG. 10. The configuration regarding receiving in the third embodiment is the same as the configuration regarding receiving in the wireless communication apparatus 200 shown in FIG. 2.

Figure 14:
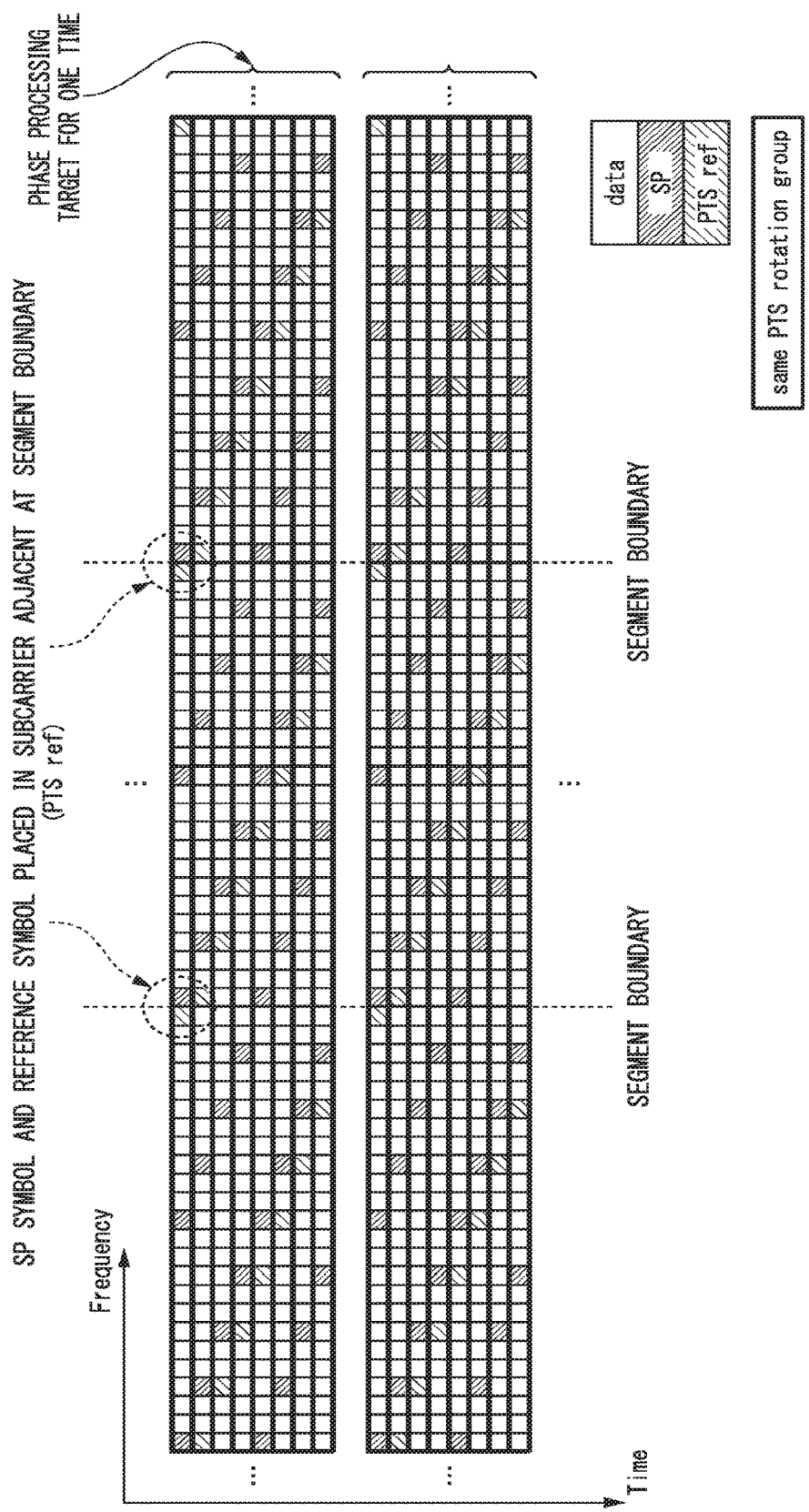
FIG. 14 is a drawing illustrating the placement of pilot symbols in a third embodiment.

FIG. 14 shows an example of the placement of pilot symbols in the third embodiment. In this drawing, the horizontal axis represents frequency, and the vertical axis represents time. In this drawing, the regions partitioned in the frequency direction and in the time direction represents wireless resources. At each wireless resource, one of data, an SP symbol, and a reference symbol (PTS ref) is placed. Similar to the placement example shown in FIG. 8, wireless resources surrounded by bold lines are performed the same phase rotation by PTS. In the placement of pilot symbols in the third embodiment, SP symbols, as described above, are placed periodically in the frequency direction and in the time direction. At resources at the same time of two subcarriers bordering at the boundary of segments, the SP symbol and a reference symbol are placed. With respect to the wireless resources of a part of a subcarrier in which the SP symbol is placed, a reference symbol is placed at a wireless resource of the same subcarrier, either before or after one OFDM symbol in the time direction. In the third embodiment, the phase processor 205 performs, for each OFDM signals of a predetermined number of OFDM symbols, phase processing that includes PTS phase rotation canceling and equalization.

Figure 15:
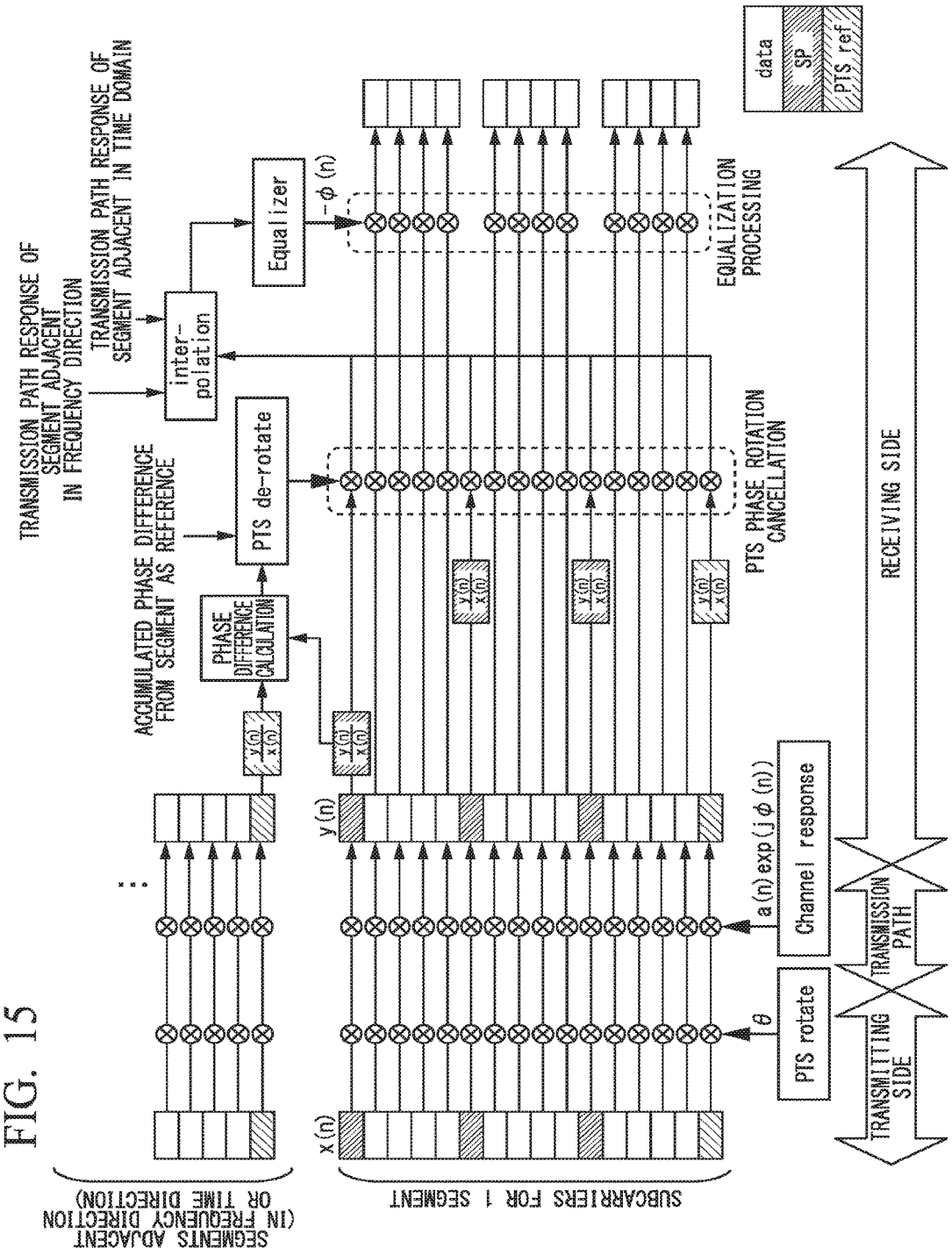
FIG. 15 is a drawing illustrating the processes of imparting, canceling, and equalizing PTS phase rotation.

FIG. 15 shows the processes of imparting and canceling the PTS phase rotation, and equalization in the third embodiment. This drawing shows the phase change in each of the transmitting-side wireless communication apparatus 100A, the transmission path, and the receiving-side wireless communication apparatus 200. In the transmitting-side wireless communication apparatus 100A, in order to reduce the PAPR, each of the partial waveform shapers 126-1, 126-2, and 126-3 performs phase rotation with a phase of $\theta$ to the symbols of all subcarriers within the segments. An OFDM signal is generated from the multiplication results respectively output from the partial waveform shapers 126-1, 126-2, and 126-3.

In the transmission path, components of all the subcarriers included in the OFDM signal are subjected to phase rotations expressed by the phase rotation amount $\phi(n)$ (n=1, 2, . . . , Nsc) in response to the frequency. The components of all the subcarrier included in the OFDM signal are subjected to the amplitude change a(n) in response to the frequency. The transmission path response of all the subcarriers is expressed as $a(n) \exp(j\phi(n))$.

In the receiving-side wireless communication apparatus 200, the phase processor 205 stores a predetermined amount of OFDM symbols for the symbol streams s203-1, s203-2, and s203-3 of each segment. In other words, the phase processor 205 stores the symbol streams s203-1, s203-2, and s203-3 of each segment for a predetermined period. The phase processor 205 has a phase processing target for each time for the symbol streams s203-1, s203-2, and s203-3 of each segment over a predetermined period that is the cancelation of PTS phase rotation and equalization.

The phase processor 205 calculates the phase difference between segments, based on a subcarrier received signal in which are placed an SP symbol and reference symbol that are placed in different segments and are adjacent at a segment boundary. The phase rotation occurring in each segment is calculated using the same method as the method described in the first and second embodiments. The phase processor 205 calculates the phase difference between segments included in OFDM signals at the same time. The phase processor 205 calculates the phase difference in the time direction between segments over a predetermined period. The phase processor 205 stores the calculated phase differences. The phase processor 205 adjusts phases of the segment to a phase of a reference segment that is selected from the segments. The phase processor 205 performs, on all segment included in the target, the phase rotation canceling a phase rotation occurred in the reference segment so as to perform PTS phase cancelation and equalization.

Figure 16:
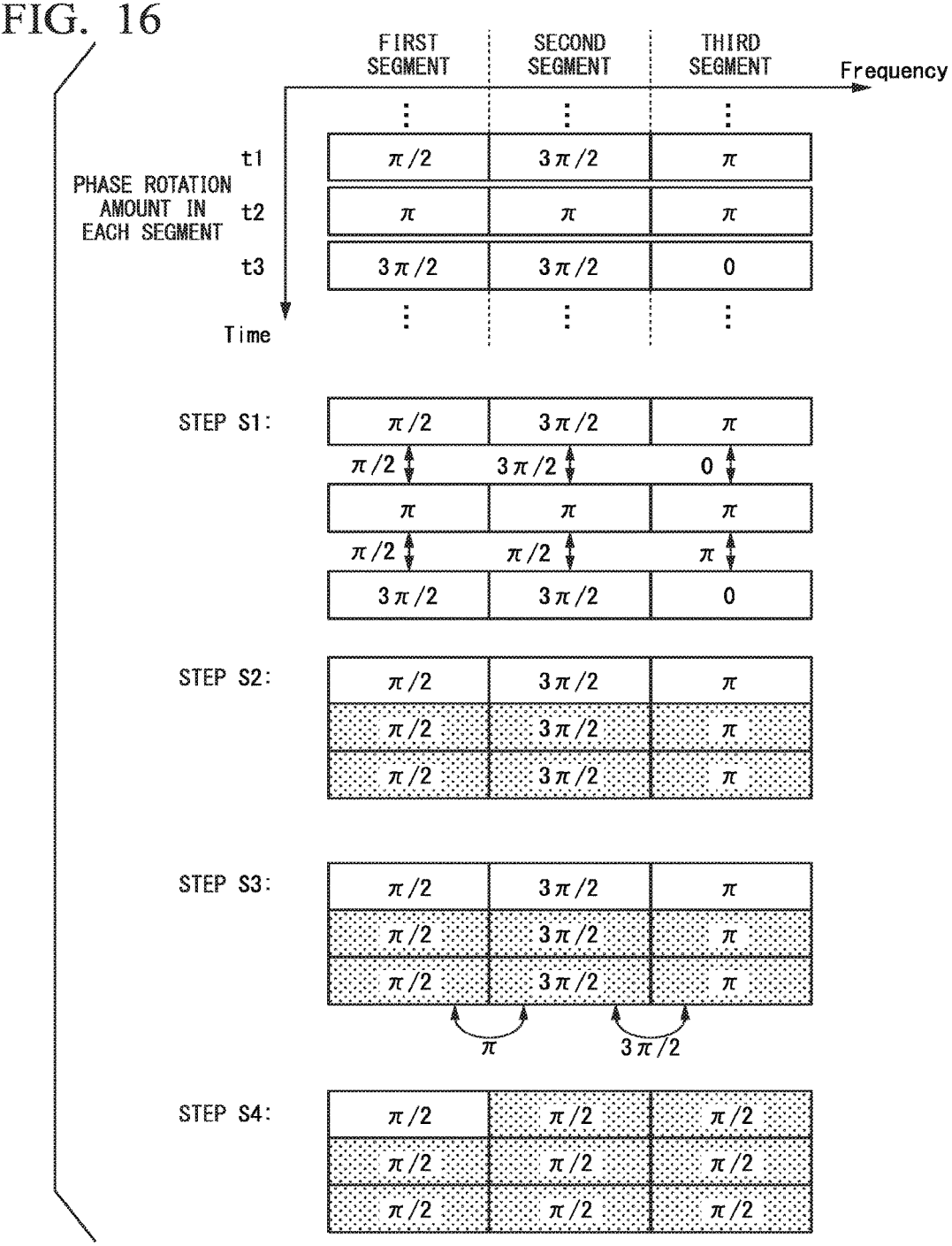
FIG. 16 is a drawing illustrating the processes of imparting, canceling, and equalizing PTS phase rotation performed by the phase processor.

FIG. 16 shows an example of the processing for PTS phase rotation canceling and equalization performed by the phase processor 205. The example shown in FIG. 16 is one in which the predetermined period is that of 3 OFDM symbols and in which a plurality of subcarriers are divided to the first, second and third segments. The segments in FIG. 16 correspond to segments that include a plurality of wireless resources surrounded by bold lines in FIG. 14. The values within the rectangles indicating each segment in FIG. 16 indicate amounts of the PST phase rotation performed at the transmitting side. The amounts of the phase rotation performed to the first, second, and third segments at time t1 are, respectively, $\pi/2$, $3\pi/2$, and $\pi$. The amounts of the phase rotation performed to the first, second, and third segments at time t2 are all $\pi$. The amounts of the phase rotation performed to the first, second, and third segments at time t3 are $3\pi/2$, $3\pi/2$, and 0. In the example shown in FIG. 16, the phase rotation of the first segment at time t1 is the reference. That is, the first segment at time t1 is the reference segment.

First, the phase processor 205, for the first, second, and third segments, calculates the phase rotations, based on a predetermined pilot symbol and the received signal of the subcarrier in which a pilot symbol is placed included in the segment. Using the calculated phase rotations of the segments, the phase processor 205 calculates the difference in phase between segments adjacent in the time direction (step S). In the calculation of the phases of each segment, the pilot symbol placed in the same subcarrier adjacent in the time direction is used. The phase processor 205, based on the phase differences of the first, second, and third segments in the time direction, cancels the phase differences (step S2). The phase processor 205 cancels the phase differences by multiplying the signals of the segments by the complex conjugate of the complex scalar value corresponding to the phase difference.

The processing when transitioning from the state at step S to the state at step S2 will now be specifically described. In the state at step S1, the phase rotation of the first segment at times t1 to t3 are $\pi/2$, $\pi$, and $3\pi/2$. Because the phase difference between the phase rotation of $\pi/2$ at time t1 and the phase rotation of $\pi$ at time t2 is $\pi/2$, processing is performed to cancel the phase difference of $\pi/2$ (that is, $\pi-\pi/2$) to the first segment at time t1. Also, because the phase difference between the phase rotation of $\pi$ at time t2 and the phase rotation of $3\pi/2$ at time t3 is $\pi/2$, taking the phase rotation amount of $\pi/2$ at time t1 as the reference, the phase rotation amount at time t3 has a difference of $(\pi/2+\pi/2)$. Therefore, with respect to the phase rotation amount of $3\pi/2$ at time t3, taking the phase rotation amount at time t1 as the reference, the phase accumulated phase difference of $(\pi/2+\pi/2)$ is calculated, and the phase difference of the rotation amount at time 13 is canceled.

With regard to the phase rotation amounts of the second and third segments from time t1 to time t3 as well, by the phase processor 205 performing processing the same as described above, the state shown at step S1 changes to the state at step S2. By canceling the phase difference at step S2, each of the phase rotation amounts of the first, second, and third segments are values that coincide in the time direction.

The phase processor 205, for each of the first, second, and third segments, calculates the phase rotation amount based on a predetermined pilot symbol and the received signal of a subcarrier in which a pilot symbol included in the segment is placed. Using the calculated phase rotation amounts for each segment, the phase processor 205 calculates the phase difference between segments that are adjacent in the frequency direction (step S3). The phase processor 205, based on the phase differences between the first, second, and third segments, cancels the phase differences (step S4).

The processing when transitioning from the state at step S2 to the state at step S4 will now be specifically described. In the state at step S2, because the phase difference between the phase rotation of the first segment is $\pi/2$ and the phase rotation of second segment is $3\pi/2$ is $(3\pi/2-\pi/2)=\pi$, processing is performed to cancel, with respect to the second segment, a phase difference of $\pi$. Because the phase difference between phase rotation amount of $3\pi/2$ of the second segment and the phase rotation amount of $\pi$ of the third segment is $(\pi-(3\pi/2))=3\pi/2$, if the phase rotation amount of $\pi/2$ of the first segment is taken as the reference, the phase rotation amount $\pi$ of the third segment has a calculated phase difference of $(\pi+3\pi/2)=\pi/2$. Therefore, with respect to the phase rotation $\pi$ of the third segment, taking the phase rotation $\pi/2$ of the first segment as the reference, the accumulated phase difference is calculated as $(\pi+3\pi/2)=\pi/2$, and the phase difference of the phase rotation of the third segment is canceled. This processing is performed all at once for the first, second, and third segments at each of the times.

By performing the processing of step S1 to step S4, the phase rotation amount of each segment at each time is made consistently $\pi/2$. That is, phase discontinuities in both the time direction and the frequency direction are canceled, enabling interpolation of the transmission path response between segments adjacent in the time direction and interpolation of the transmission path response between segments adjacent in the frequency direction. The phase rotation amount of $\pi/2$ in each segment can be treated as the phase rotation occurring in the transmission path, and is canceled by equalization processing. In the processing example shown in FIG. 16, the description is for the case of canceling the phase difference between segments in the time direction, followed by canceling of the phase difference between segments in the frequency direction. However, the phase difference between segments in the time direction may be done after canceling the phase difference between segments in the frequency direction.

Figure 17:
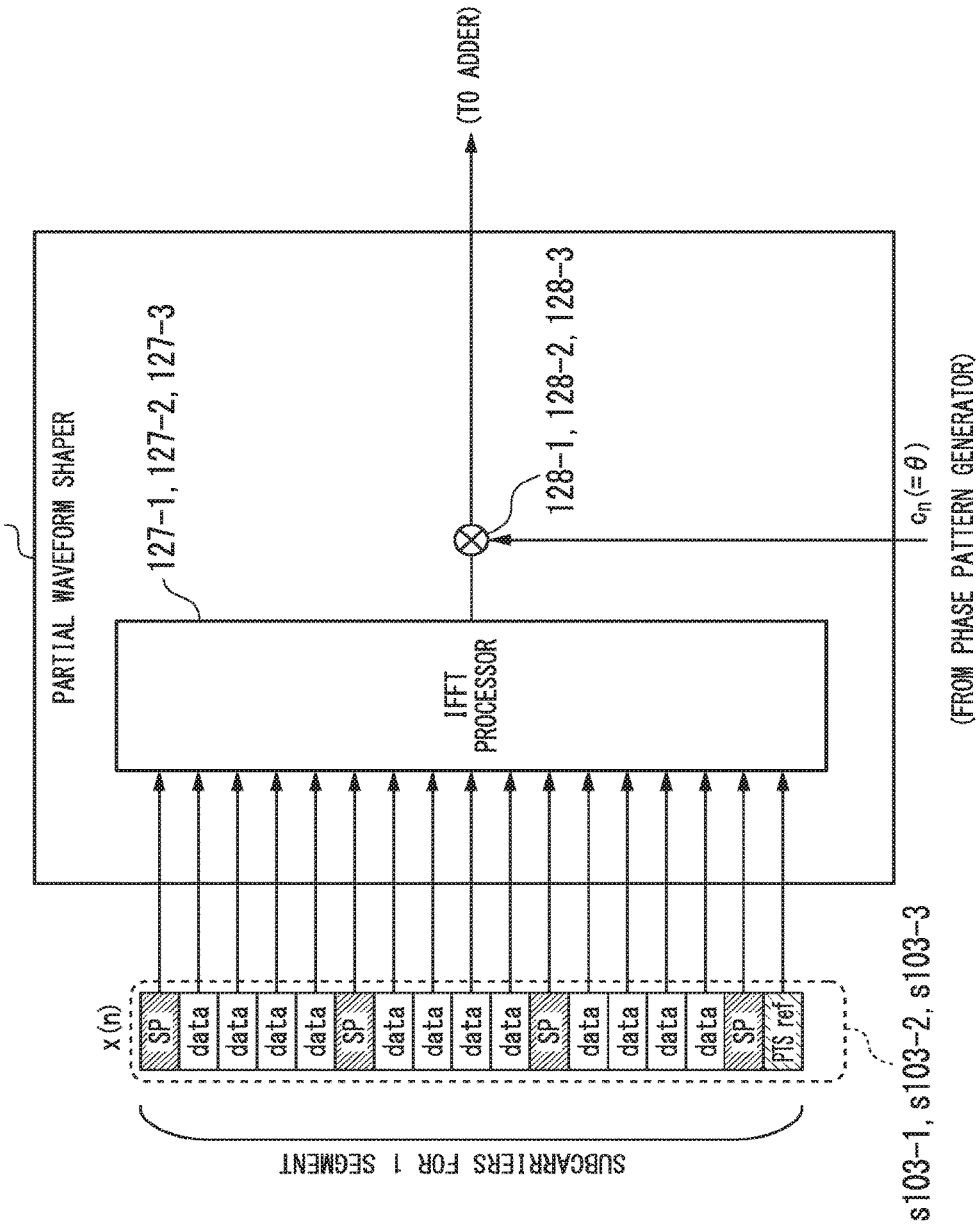
FIG. 17 is a block diagram illustrating the detailed configuration of the partial waveform shaper.

FIG. 17 is a block diagram illustrating the detailed configuration of the partial waveform shapers 126-1, 126-2, and 126-3 in the third embodiment. The partial waveform shaper 126-1 in the third embodiment has a configuration that performs a PTS phase rotation to symbols of all subcarriers in which data, SP symbols and reference symbol are placed. For that reason, compared to the partial waveform shapers in the first and second embodiments, the configuration of the partial waveform shapers in the third embodiment is simple.

Figure 18:
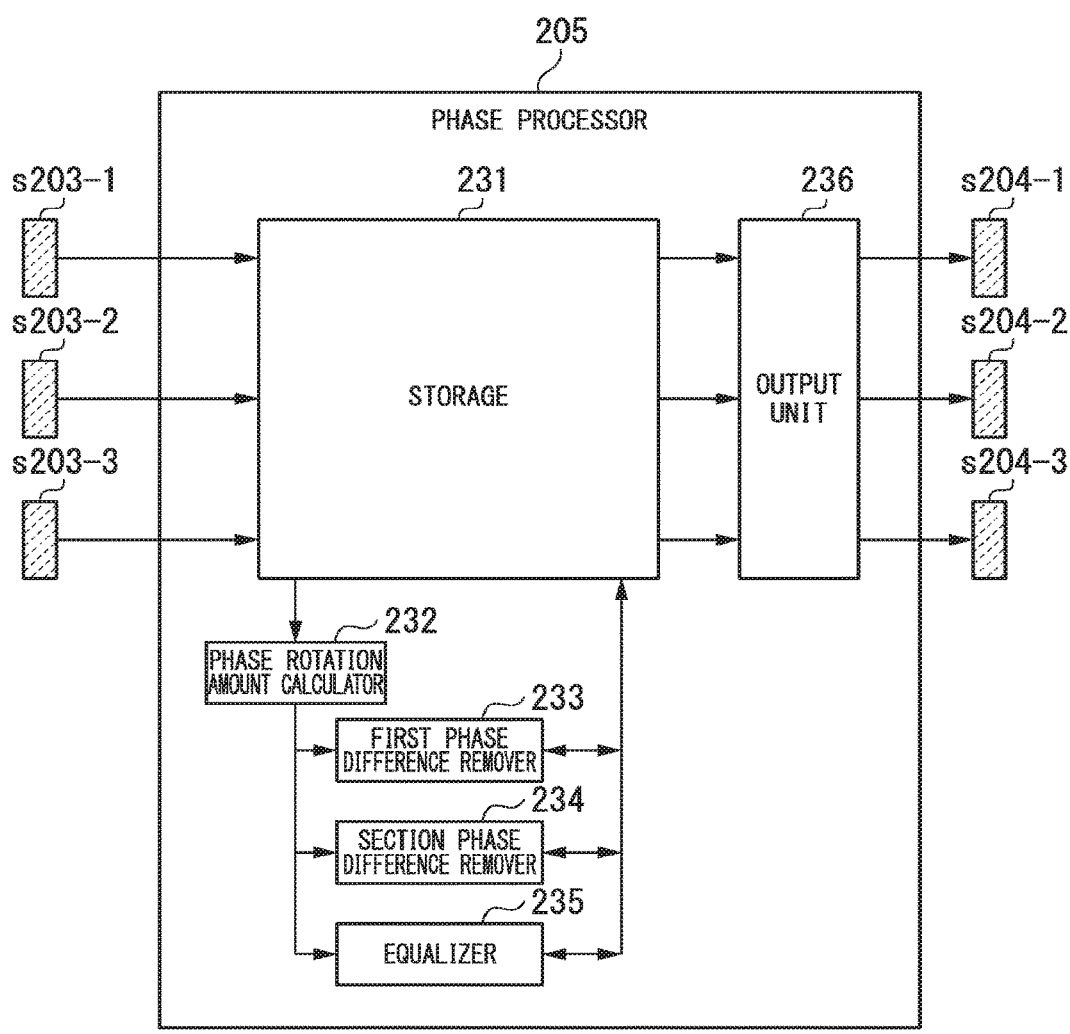
FIG. 18 is a block diagram illustrating the configuration of phase processor.

FIG. 18 is a block diagram illustrating the configuration of the phase processor 205 in the third embodiment. As shown in this drawing, the phase processor 205 has a storage 231, a phase rotation amount calculator 232, a first phase difference remover 233, a second phase difference remover 234, an equalizer 235, and an output unit 236. The storage 231 stores the symbol streams s203-1, s203-2, and s203-3 of the first, second, and third segments in a predetermined period. The phase rotation amount calculator 232 reads out symbols of the first, second, and third segments for each time from the storage 231. The phase rotation amount calculator 232, based on, of the read-out symbols, the symbols of subcarriers in which pilot symbols are placed, and on a predetermined pilot symbol, calculates the phase rotation amount in each segment as a third amount of phase rotation.

The first phase difference remover 233, based on the phase rotation amounts of each segment calculated by the phase rotation amount calculator 232, calculates the accumulated phase difference, with the phase rotation amount of a predetermined segment as a reference, of the same segments as the reference at other times. The first phase difference remover 233 reads out the symbol streams of a segment at other times from the storage 231 for each segment, and cancels the accumulated phase difference in the read-out segment symbol streams. The first phase difference remover 233 writes the symbol streams from a segment in which the accumulated phase difference has been canceled back into the storage 231, thereby updating the symbol stream of that segment.

The second phase difference remover 234, based on the phase rotation amount of each segment calculated by the phase rotation amount calculator 232, taking the phase rotation amount of a predetermined segment as a reference, calculates the accumulated phase difference of other segments at the same time. The second phase difference remover 234 reads out from the storage the symbol streams of other segments at the same time, for each segment, and cancels the accumulated phase difference of the read-out symbol streams. The second phase difference remover 234 writes the symbol streams from a segment in which the accumulated phase difference has been canceled back into the storage 231, thereby updating the symbol stream of that segment.

The equalizer 235 performs equalization of the phase rotation amount of each segment stored in the storage, based on the phase rotation amount calculated by the phase rotation amount calculator 232. The equalizer 235 performs equalization of each segment, after cancellation of the accumulated phase differences by the first phase difference remover 233 and the second phase difference remover 234. After equalization by the equalizer 235, the output unit 236 reads out from the storage 231 in time sequence the symbol streams of the first, second, and third segments, and outputs the read-out symbol streams as the symbol streams s204-1, s204-2, and s204-3.

In the third embodiment, instead of the phase rotation amount by PTS in other segments, the phase difference is calculated taking the phase rotation amount in a predetermined segment as the reference. Instead of the phase rotation amount in the wireless communication apparatus, the phase rotation amount of the segment taken as the reference is calculated with the phase rotation amount that includes the phase rotation amount by the transmission path and the phase rotation amount by PTS as the reference. In this manner, by the wireless communication apparatus 200 in the third embodiment indirectly acquiring the phase rotation amount by the PTS and the phase rotation amount in the wireless transmission path and canceling each phase rotation, the transmitted data can be acquired from a received signal to which PTS is applied.

Fourth Embodiment

Figure 19:
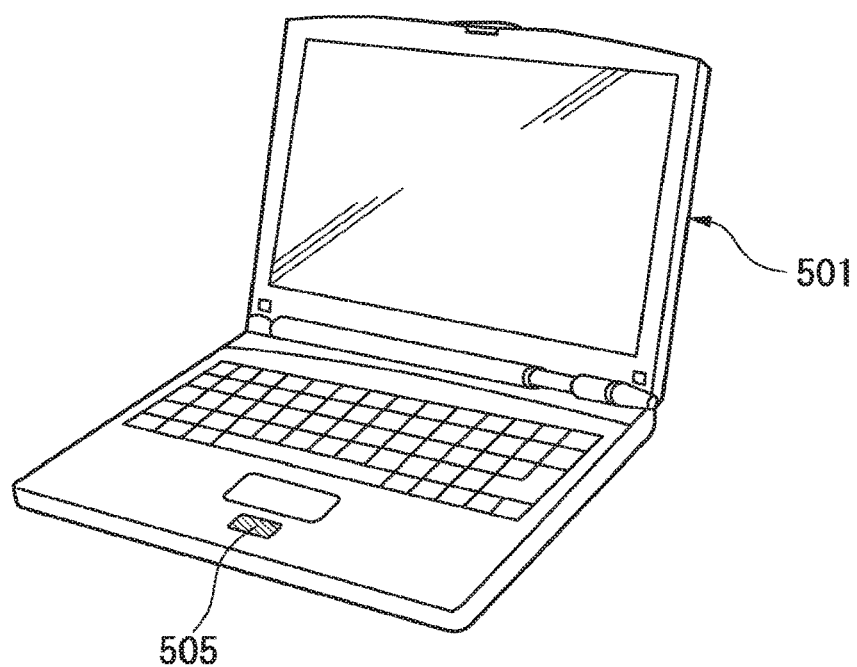
FIG. 19 is a first outer view of a wireless communication apparatus in a fourth embodiment.
Figure 21:
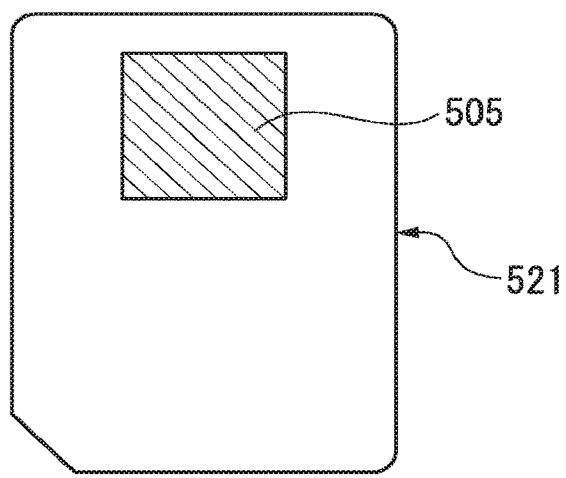
FIG. 21 is a third outer view of the wireless communication apparatus.

FIG. 19, FIG. 20, and FIG. 21 are outer views of wireless communication apparatuses in the fourth embodiment. The wireless communication apparatus shown in FIG. 19 is a laptop computer 501, which has a communication module 505. The communication module 505 is configured to include the elements of one of the wireless communication apparatuses 100 and 100A of the first to third embodiments. The communication module 505, for example, is configured to include, in a single integrated circuit, the error correction encoder 101, the constellation mapper 102, the serial/parallel converter 103, the pilot inserter 104, the segment divider 105, the partial waveform shapers 106-1, 106-2, and 106-3, the adder 109, the phase rotation pattern generator 110, the PAPR evaluator 111, and the GI inserter 112 of the wireless communication apparatus 100 (FIG. 1) of the first embodiment. The communication module 505 may be implemented as an integrated circuit that includes the elements of any one of the wireless communication apparatus 100 shown in FIG. 1, the wireless communication apparatus 100A shown in FIG. 10, the wireless communication apparatus 200 shown in FIG. 2.

The communication module 505 may be configured to include an analog IC into which the RF processor 113 is implemented, and an integrated circuit for baseband signal processing that includes the error correction encoder 101, the constellation mapper 102, the serial/parallel converter 103, the pilot inserter 104, the segment divider 105, the partial waveform shapers 106-1, 106-2, and 106-3, the adder 109, the phase rotation pattern generator 110, the PAPR evaluator 111, and the GI inserter 112.

The wireless communication apparatus shown in FIG. 20 is a mobile terminal 511, which has the communication module 505. The wireless communication apparatus having the communication module 505 is not restricted to the laptop computer 501 and the mobile terminal 511 shown in FIG. 19 and FIG. 20. For example, the wireless communication apparatus may be a smartphone, a tablet-type terminal, a television receiver, a digital camera, a wearable device, or a game machine. It may also be a vehicle-borne device such as a navigation device. The wireless communication apparatus may be either a portable type that is easily carried around or a desktop type. As shown in FIG. 21, a memory card 521 having the communication module 505 may be the wireless communication apparatus. A device into which the memory card 521 is inserted can use data acquired by the communication module 505 of the memory card 521 and transmit data via the communication module 505.

Fifth Embodiment

Figure 22:
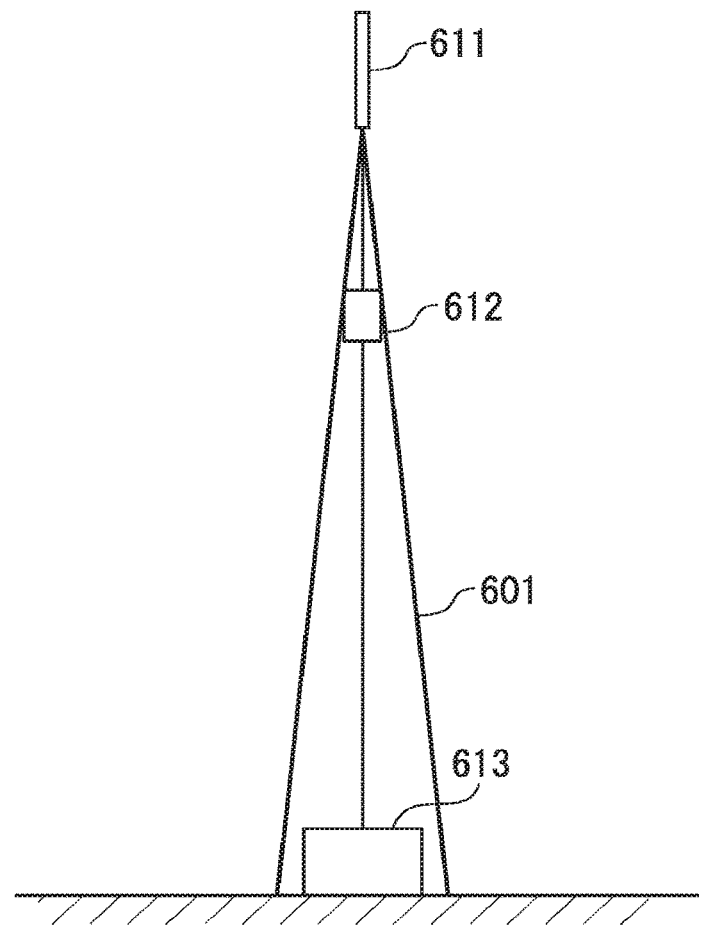
FIG. 22 is a drawing generally illustrating a wireless communication apparatus in a fifth embodiment.

FIG. 22 generally shows a wireless communication apparatus in the fifth embodiment. The wireless communication apparatus shown in FIG. 22 has an antenna apparatus 611, an RF apparatus 612, and a baseband apparatus 613, and is installed on a structure 601. The antenna apparatus 611 has one or more antennas connected to, for example, the wireless communication apparatus 100 (FIG. 1) in the first embodiment. The RF apparatus 612 has the RF processor 113 provided in the wireless communication apparatus 100. The baseband apparatus 613 has the error correction encoder 101, the constellation mapper 102, the serial/parallel converter 103, the pilot inserter 104, the segment divider 105, the partial waveform shapers 106-1, 106-2, and 106-3, the adder 109, the phase rotation pattern generator 110, the PAPR evaluator 111, and the GI inserter 112 of the wireless communication apparatus 100. That is, the wireless communication apparatus in the fifth embodiment is configured by three apparatuses, the antenna apparatus 611, the RF apparatus 612, and the baseband apparatus 613, and performs the same processing as the wireless communication apparatus 100.

The wireless communication apparatus in the fifth embodiment may perform processing that is the same as any of the wireless communication apparatus 200 in the first embodiment, and the wireless communication apparatus 100A in the second and third embodiment. The RF apparatus 612 may have the RF processor 201 provided in the wireless communication apparatus 200 in the first, second, and third embodiment.

As shown in FIG. 12, the antenna apparatus 611 is arranged at a high location on the structure 601. The structure 601 may be one that has a wall or roof, or may have a steel frame construction but not have a wall and a roof. The RF apparatus 612 is installed on the structure 601 at a location close to the antenna apparatus 611, and supplies an OFDM signal that is transmitted from the antenna of the antenna apparatus 611. The baseband apparatus 613 is installed at some location on the structure 601 and supplies an OFDM signal to the RF apparatus 612.

The baseband apparatus 613 may be configured to include one or more FPGAs. In this case, by reading out a configuration stored in a non-volatile storage medium included in the baseband apparatus 613, the one or more FPGAs execute the operations of the error correction encoder 101, the constellation mapper 102, the serial/parallel converter 103, the pilot inserter 104, the segment divider 105, the partial waveform shapers 106-1, 106-2, and 106-3, the adder 109, the phase rotation pattern generator 110, the PAPR evaluator 111, and the GI inserter 112. If the wireless communication apparatus in the fifth embodiment performs the same processing as the wireless communication apparatus 200, the one or more FPGAs, by reading in the configuration, executes the operations of the GI remover 202, the FFT processor 203, the segment divider 204, the phase processor 205, the segment combiner 206, the parallel/serial converter 207, the constellation demapper 208, and the error correction decoder 209.

The baseband apparatus 613 may further have an interface that accepts data to be transmitted. The baseband apparatus 613 may further have a power supply. The baseband apparatus 613 may further have a data updater that updates the FPGA configuration stored in a non-volatile storage medium.

In the foregoing, the description has been of a configuration in which the wireless communication apparatus has an antenna. However, the wireless communication apparatus need not have an antenna, in which case transmitting and receiving are done via an antenna connected to the wireless communication apparatus.

Sixth Embodiment

The wireless communication apparatus in the sixth embodiment, in addition to the elements of any one of the wireless communication apparatuses of the above-described embodiments, has a bus, a processor, a storage, and an external interface. The processor and the external interface are connected to the various elements via the bus. By executing firmware stored in the storage, the processor controls the various elements. In this manner, by the wireless communication apparatus including a storage that stores firmware, the firmware can be rewritten to easily change the functions of the wireless communication.

Seventh Embodiment

The wireless communication apparatus in the seventh embodiment, in addition to the elements of any one of the wireless communication apparatuses of the above-described embodiments, has a clock generator. The clock generator generates a clock signal and outputs the clock signal to outside the wireless communication apparatus by an output terminal. In this manner, the clock signal generated within the wireless communication apparatus causes the host side to operate by a clock signal output to the outside, enabling synchronized operation between the host side and the wireless communication apparatus side.

Eighth Embodiment

The wireless communication apparatus in the eighth embodiment, in addition to the elements of any one of the wireless communication apparatuses of the above-described embodiments, has a power supply, a power supply controller, and a wireless power supplier. The power supply controller is connected to the power supply and the wireless power supplier and controls the selection of the power supplied to the wireless communication apparatus. In this manner, adopting a configuration in which a power supply is included in the wireless communication apparatus enables operation with reduced power consumption in which the power supply is controlled.

Ninth Embodiment

The wireless communication apparatus in the ninth embodiment, in addition to the elements of any one of the wireless communication apparatuses of the above-described embodiments, has a SIM card and a controller. The controller, for example, performs authentication using the identification information stored in the SIM card and performs control so that transmission or receiving are not performed in the wireless communication apparatus, depending upon the authentication result. In this manner, by the wireless communication apparatus having the SIM card and a controller, operation can be done based on the authentication result.

Tenth Embodiment

The wireless communication apparatus of the tenth embodiment, in addition to the elements of any one of the wireless communication apparatuses of the above-described embodiments, has a video compressor/expander. The video compressor/expander is connected to a bus. In this manner, by having a video compressor/expander, the wireless communication apparatus is able to transmit compressed video images and expand the received compressed video images.

Eleventh Embodiment

The wireless communication apparatus in the eleventh embodiment, in addition to the elements of any one of the wireless communication apparatuses according to the above-described embodiments, has an LED unit and a controller. The controller acquires whether or not each of the elements is operating and the amount of data transmitted or received and the like. The controller, based on the operation states of the elements or the amount of data being processed, causes the LED of the LED unit to light or to flash. By lighting or flashing the LED depending upon the operation state of the wireless communication apparatus, the wireless communication apparatus is able to notify the user of the operation state of the wireless communication apparatus.

Twelfth Embodiment

The wireless communication apparatus of the twelfth embodiment, in addition to the elements of any one of the wireless communication apparatuses according to the above-described embodiments, has a vibrator and a controller. The controller acquires whether or not each of elements is operating and the amount of transmitted or received data and the like. The controller operates the vibrator, based on the operation states of the elements or the amount of data being processed. For example, when the controller operates the vibrator, it controls the size and the interval of the vibrations generated by the vibrator. By operating the vibrator, the wireless communication apparatus is able to notify the user of the operation state of the wireless communication apparatus.

Thirteenth Embodiment

The wireless communication apparatus in the thirteenth embodiment has the elements regarding transmission and does not have the elements regarding receiving of the wireless communication apparatus of any one of the first, second, and third embodiments. The wireless communication apparatus in the thirteenth embodiment mainly performs transmission of data.

Fourteenth Embodiment

The wireless communication apparatus in the fourteenth embodiment has the elements regarding receiving and does not have the elements regarding transmission of the wireless communication apparatus of any one of the first, second, and third embodiments. The wireless communication apparatus in the fourteenth embodiment mainly performs receiving of data.

Fifteenth Embodiment

The wireless communication apparatus of the fifteenth embodiment has the elements regarding transmission of the wireless communication apparatuses 100 and 100A of the embodiments, and the element regarding receiving of the wireless communication apparatus 200 of the embodiments. The wireless communication apparatus of the fifteenth embodiment performs data transmission and data receiving In the above-described embodiments, the description has been for a configuration in which the IFFT processors 108-1, 108-2, 108-3, 127-1, 127-2, and 127-3 perform an inverse FFT, and the FFT processor 203 performs an FFT. Instead of an inverse FFT (inverse fast Fourier transform), the IFFT processors 108-1, 108-2, 108-3, 127-1, 127-2, and 127-3 may convert the modulation symbols of each subcarrier into a time-domain signals by performing an inverse Fourier transform or an inverse discrete Fourier transform. Also, the FFT processor 203, instead of an FFT (fast Fourier transform), may convert the signal obtained from the received signal into a frequency-domain signal by performing a Fourier transform or a discrete Fourier transform.

In the foregoing, the description has been of a configuration in which the wireless communication apparatus has an antenna. However, the wireless communication apparatus need not have an antenna, in which case transmitting and receiving are done via an antenna connected to the wireless communication apparatus.

The wireless communication apparatuses described in the above-described embodiments can be implemented by hardware that includes, for example, a general-purpose processor. The elements of the wireless communication apparatus are implemented by a processor included in the hardware of the wireless communication apparatus executing a program. This program may be installed beforehand into a non-volatile storage medium included in the hardware that can be read out by the processor. The hardware may acquire a program distributed via a network and install it into a non-volatile storage media.

For example, the processor operates as the error correction encoder 101, the constellation mapper 102, the serial/parallel converter 103, the reference symbol inserters 104, the partial waveform shapers 106-1, 106-2 and 106-3, the adder 109, the PAPR evaluator 111, and the GI inserter 112 of the wireless communication apparatus 100. In this case, the hardware that includes the processor inputs data that includes a bit stream to be transmitted and generates an OFDM signal from the data. The hardware performs transmission signal processing to the OFDM signal into which a guard interval has been inserted, and sends the signal from a connected antenna.

An integrated circuit that includes a processor and a non-volatile storage medium may operate as the elements of the wireless communication apparatuses described in the above-described embodiments. For example, by the processor in the integrated circuit executing a program stored in the non-volatile storage medium, the processor operates as the elements of the wireless communication apparatus 100. In this case, the integrated circuit inputs the data that includes the bit stream to be transmitted and generates an OFDM signal from the data. The integrated circuit performs transmission signal processing of the OFDM signal into which a guard interval has been inserted. The integrated circuit transmits the signal obtained from the transmission signal processing from a connected antenna.

According to at least one of the above-described embodiments, by having a multiplier that, of the subcarriers included in each segment, does not perform a phase rotation by PTS a symbol of a subcarrier in which an SP symbol or a reference symbol is placed, it is possible at the receiving side to acquire the phase rotation amount in the transmission path or the PTS phase rotation amount from a signal of a subcarrier of the SP symbol or reference symbol to which a phase rotation is not performed. Based on the signal of a subcarrier of the SP symbol or reference symbol to which a phase rotation has been performed and the acquired phase rotation amount, it is possible to acquire the phase rotation amount in the wireless transmission path or the PTS phase rotation amount.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A wireless communication apparatus comprising:
 a pilot inserter that inserts first and second pilot symbols into a symbol stream including modulation symbols, the pilot inserter inserting a zero symbol into the symbol stream as the second pilot symbol;
 a segment divider that divides into a plurality of segments a plurality of subcarriers, wherein each of the subcarriers is allocated with a respective one symbol of the modulation symbols and the first and second pilot symbols included in the symbol stream;
 a phase rotator that, for each segment, performs a phase rotation to the modulation symbols and a predetermined one of the first and second pilot symbols included in the symbol stream, the other of the first and second pilot symbols being excluded from the phase rotation;
 an inverse Fourier transformer that, using an inverse Fourier transform, for each of the segments, transforms, into a time-domain signal, a signal of each segment to which the phase rotation has been performed by the phase rotator;
 a second adder that adds the time-domain signals corresponding to the segments with respective sine wave signals which are defined depending upon frequencies of the subcarriers into which the second pilot symbol has been inserted; and a first adder that adds together the time-domain signals after added with the respective sine wave signals to generate a transmission signal.

2. The wireless communication apparatus according to claim 1, wherein the first pilot symbol is periodically inserted into the plurality of subcarriers, and at least one of the second pilot symbol is inserted into each of the segments.

3. The wireless communication apparatus according to claim 1, wherein the pilot inserter inserts the second pilot symbol into a subcarrier of the plurality of subcarriers, the subcarrier into which the second pilot symbol is inserted is adjacent to the subcarrier into which the first pilot symbol is inserted.

4. The wireless communication apparatus according to claim 1, further comprising a radio frequency (RF) processor that performs transmission signal processing for signal transmission from an antenna.

\* \* \* \* \*